United States Patent
Kim et al.

(10) Patent No.: US 12,162,260 B1
(45) Date of Patent: Dec. 10, 2024

(54) AEROGEL COMPOSITE

(71) Applicant: LG Chem, Ltd., Seoul (KR)

(72) Inventors: Mi Ri Kim, Daejeon (KR); Ja Pil Koo, Daejeon (KR); Kyoung Shil Oh, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 18/435,481

(22) Filed: Feb. 7, 2024

(30) Foreign Application Priority Data

Oct. 5, 2023 (KR) .................. 10-2023-0132930

(51) Int. Cl.
B32B 5/24 (2006.01)
(52) U.S. Cl.
CPC ........ B32B 5/245 (2013.01); *B32B 2262/101* (2013.01); *B32B 2266/102* (2016.11); *B32B 2266/126* (2016.11); *B32B 2307/304* (2013.01); *B32B 2307/54* (2013.01); *B32B 2307/72* (2013.01); *B32B 2307/7376* (2023.05)
(58) Field of Classification Search
CPC .............. B32B 5/245; B32B 2266/102; B32B 2266/126
See application file for complete search history.

(56) References Cited

U.S. PATENT DOCUMENTS

| | | | |
|---|---|---|---|
| 2,734,827 A | 2/1956 | Hooks | |
| 7,560,062 B2 | 7/2009 | Gould et al. | |
| 10,759,666 B2 | 9/2020 | Hindelang et al. | |
| 11,577,490 B2 | 2/2023 | Oikawa et al. | |
| 2002/0094426 A1 | 7/2002 | Stepanian et al. | |
| 2010/0143717 A1 | 6/2010 | Sakamoto et al. | |
| 2016/0369059 A1 | 12/2016 | Kotake et al. | |
| 2017/0210092 A1* | 7/2017 | Rikleen | B32B 5/026 |
| 2018/0134566 A1 | 5/2018 | Kim et al. | |
| 2018/0244029 A1 | 8/2018 | Kim et al. | |
| 2018/0313001 A1* | 11/2018 | Dempsey | D01F 1/10 |
| 2019/0062167 A1 | 2/2019 | Kim et al. | |
| 2020/0048100 A1 | 2/2020 | Yu et al. | |
| 2020/0108583 A1 | 4/2020 | Oikawa et al. | |
| 2020/0215791 A1 | 7/2020 | Oh et al. | |
| 2020/0378058 A1 | 12/2020 | Oikawa et al. | |
| 2021/0016239 A1 | 1/2021 | Kim et al. | |
| 2021/0309527 A1 | 10/2021 | Evans et al. | |

(Continued)

FOREIGN PATENT DOCUMENTS

| | | |
|---|---|---|
| CN | 101680128 B | 1/2013 |
| CN | 107140938 A | 9/2017 |

(Continued)

OTHER PUBLICATIONS

Emmerling, A., and J. Fricke. "Small angle scattering and the structure of aerogels." Journal of non-crystalline solids 145 (1992): 113-120. 8 pgs.

(Continued)

*Primary Examiner* — Michael Zhang
(74) *Attorney, Agent, or Firm* — Lerner David LLP

(57) ABSTRACT

An aerogel composite having an excellent level of thermal insulation even when compressed and deformed under application of pressure resulting from various causes is provided. The aerogel composite can be used as a thermal insulation material for batteries, electronic devices, automobiles, industrial equipment, structures, or the like.

19 Claims, 2 Drawing Sheets

(56) References Cited

U.S. PATENT DOCUMENTS

| | | | |
|---|---|---|---|
| 2021/0363699 A1 | 11/2021 | Afshari et al. | |
| 2021/0370636 A1* | 12/2021 | Tsuruta | B32B 5/18 |
| 2022/0098046 A1 | 3/2022 | Lee et al. | |
| 2022/0195137 A1 | 6/2022 | Movahhed et al. | |
| 2023/0050685 A1 | 2/2023 | Kim et al. | |
| 2023/0348285 A1 | 11/2023 | Numrich et al. | |

FOREIGN PATENT DOCUMENTS

| | | | |
|---|---|---|---|
| CN | 106565268 B | 1/2020 | |
| CN | 113939942 A | 1/2022 | |
| CN | 115748088 A | 3/2023 | |
| CN | 116154360 A | 5/2023 | |
| CN | 116945715 A | 10/2023 | |
| JP | WO2017221687 A1 | 1/2019 | |
| JP | 2020060291 A | 4/2020 | |
| JP | 2021036038 A | 3/2021 | |
| JP | 2022529347 A | 6/2022 | |
| JP | 7285085 B2 | 6/2023 | |
| JP | 7352769 B2 | 9/2023 | |
| JP | 7368327 B2 | 10/2023 | |
| KR | 100909732 B1 | 7/2009 | |
| KR | 101281689 B1 | 7/2013 | |
| KR | 20130138275 A | 12/2013 | |
| KR | 20160125956 A | 11/2016 | |
| KR | 101752091 B1 | 6/2017 | |
| KR | 20170098141 A | 8/2017 | |
| KR | 20170132829 A | 12/2017 | |
| KR | 20180033064 A | 4/2018 | |
| KR | 101911188 B1 | 10/2018 | |
| KR | 101966406 B1 | 4/2019 | |
| KR | 101993643 B1 | 6/2019 | |
| KR | 20200073730 A | 6/2020 | |
| KR | 20200095323 A | 8/2020 | |
| KR | 102192354 B1 | 12/2020 | |
| KR | 20210071508 A | 6/2021 | |
| KR | 20210146798 A | 12/2021 | |
| KR | 20220049841 A | 4/2022 | |
| KR | 20220154727 A | 11/2022 | |
| KR | 20220164499 A | 12/2022 | |
| KR | 20230005300 A | 1/2023 | |
| WO | 2018163354 A1 | 9/2018 | |

OTHER PUBLICATIONS

Yan-Jun Dai, et al., "A Theoretical Model for the Effective Thermal Conductivity of Silica Aerogel Composites", Applied Thermal Engineering, (Sep. 2017). 29 pgs.

Jun-Jie Zhao, et al., "A 3-D numerical heat transfer model for silica aerogels based on the porous secondary nanoparticle aggregate structure", Journal of Non-Crystalline Solids,; vol. 358, Issue 10, (Mar. 2012), pp. 1287-1297.

A Klochkov et al., "Pulse NMR of 3He in aerogel at temperature 1.5 K", Journal of Physics: Conference Series 150 (Feb. 2009) 032043. 5 pgs.

Jeong, Sangbae, et al., "Application of Silica Aerogel as an Interlayer Insulating Film", The Korean Ceramic Society, Ceramist, vol. 4, Issue 6, pp. 84-90, Dec. 2001.

* cited by examiner

[Fig. 1]
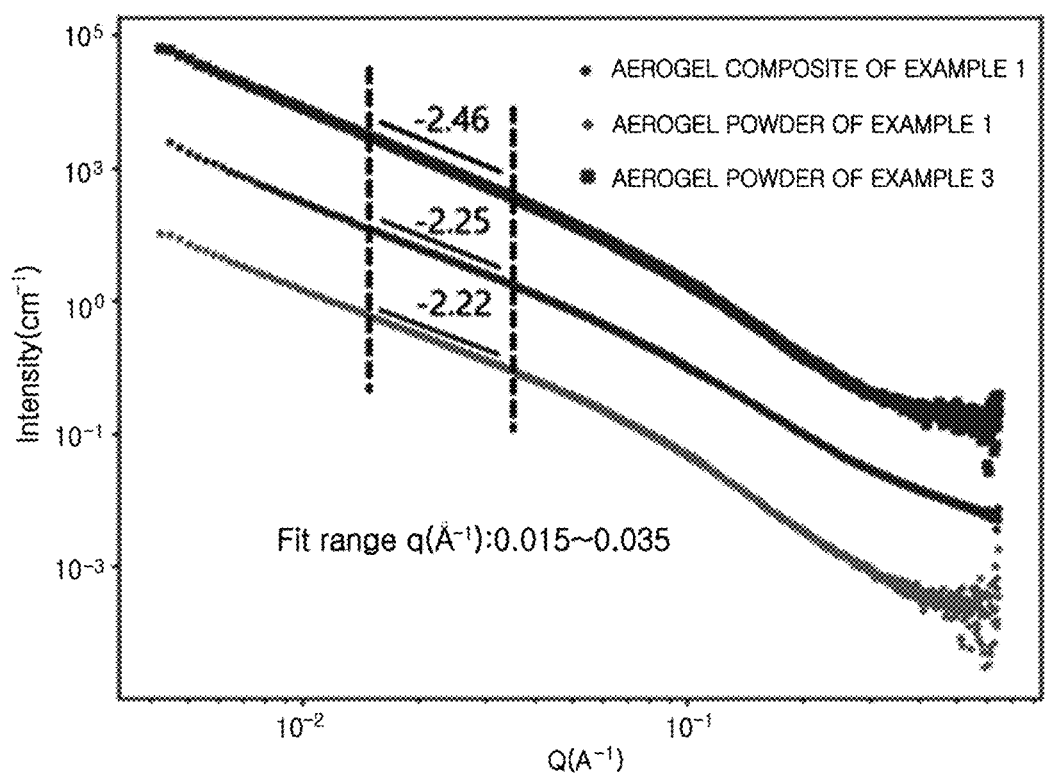

[Fig. 2]
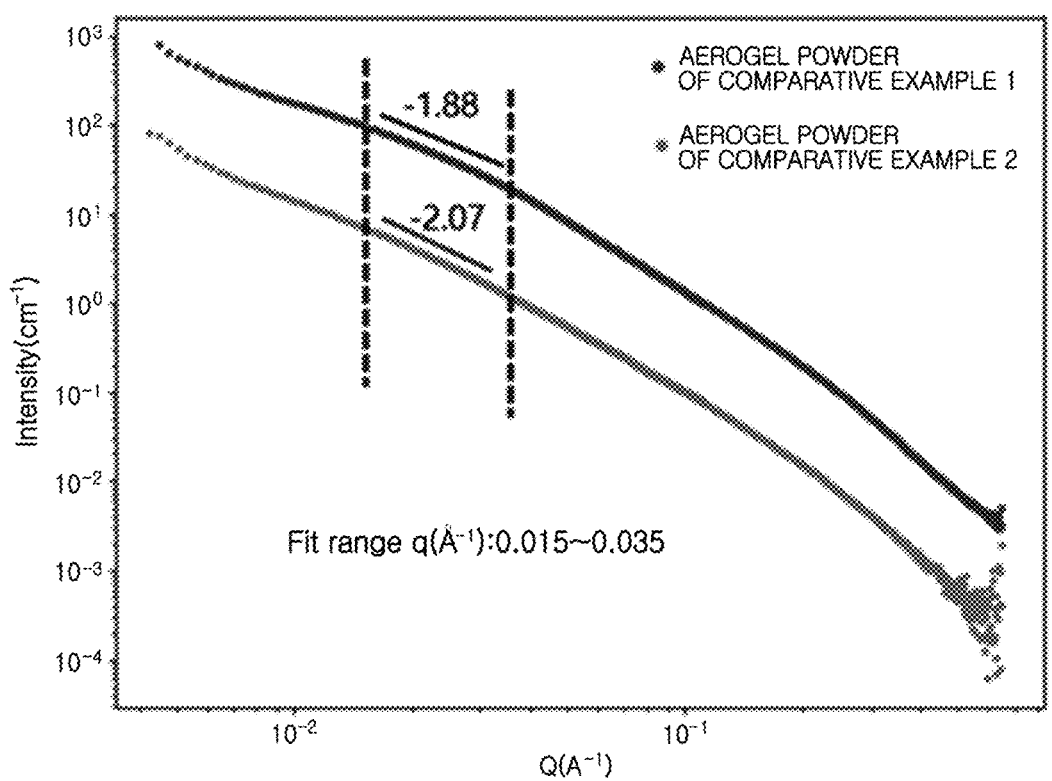

AEROGEL COMPOSITE

CROSS-REFERENCE TO RELATED APPLICATION

This application claims priority to Korean Patent Application No. 10-2023-0132930 filed on Oct. 5, 2023, the disclosure of which is incorporated herein in its entirety by reference.

BACKGROUND

The present disclosure relates to an aerogel composite and the application use thereof as a thermal insulation material.

Aerogel is a superporous material with a high specific surface area (>500 m$^2$/g), having a porosity of about 90% to 99.9% and a pore size ranging from 1 nm to 100 nm, and is a material having excellent ultra-lightweight/superthermal insulation/ultra-low dielectric properties. Accordingly, research on developing an aerogel material and using the same as a material for a transparent thermal insulation material, an environmentally friendly thermal insulation material for high temperatures, an extremely-low dielectric film for a highly integrated device, a catalyst, a catalyst carrier, an electrode for a supercapacitor, or an electrode for seawater desalination is actively ongoing.

The biggest advantages of an aerogel are that it has super-insulation properties exhibiting a thermal conductivity of approximately 0.300 W/mK or less, which is lower than that of a typical organic thermal insulation material such as Styrofoam, thereby solving the problems associated with the conventional organic heat insulation material, such as fire vulnerability and generation of harmful gases in case of a fire.

In general, an aerogel is produced by preparing hydrogel from a silica precursor such as water glass and alkoxysilane series (TEOS, TMOS, MTMS, and the like), and removing liquid components inside the hydrogel without destroying a microstructure.

Particularly, a hydrophobic silica aerogel blanket in which a hydrophobic silica aerogel is formed in a fiber is a functional thermal insulation material which prevents corrosion caused by moisture, and is widely used in construction or industrial fields, and in addition, the hydrophobic silica aerogel blanket may be used as a thermal insulation material, heat insulation material, or non-combustible material for aircraft, ships, automobiles, batteries, and the like.

However, when the silica aerogel blanket is applied for the above uses, there have been problems in that when a pressurization environment is provided due to continuous thermal expansion of a device positioned adjacent thereto, or when a large pressure is applied from the surroundings during the installation of an aerogel thermal insulation material, the aerogel structure collapses, so that the thermal insulation properties are significantly reduced.

SUMMARY

The present disclosure provides an aerogel composite capable of maintaining constant thermal insulation properties without significant degradation even when exposed to a pressurization environment, and a thermal insulation member including the same.

However, the technical task to be achieved by the present disclosure is not limited to the aforementioned task, and other tasks that are not mentioned will be clearly understood by those skilled in the art from the following description.

In accordance with some embodiments of the present disclosure, an aerogel composite includes a fiber substrate, and an aerogel in which a plurality of open pores are formed, wherein the aerogel includes a plurality of silica aerogel particles, and in a small angle X-ray scattering (SAXS) graph showing a log plot of scattering intensity versus wave number for the aerogel particles, slope in a wave number ranging from 0.015/Å to 0.035/Å is shown to be from −2.80 to −2.20.

In some embodiments, the small angle X-ray scattering graph may be a graph derived from small angle X-ray diffraction analysis of aerogel particles separated from the aerogel composite.

In some embodiments, the small angle X-ray scattering graph may be a graph derived from small angle X-ray diffraction analysis of aerogel particles in the aerogel composite.

In some embodiments, when the aerogel composite is compressed by application of a pressure of 3 bar, 9 bar, and 24 bar in a horizontal direction (transverse direction) with respect to a cross-section of the aerogel composite along in the horizontal direction (transverse direction), the heat transmission coefficient after the compression may be equal to or less than 1.8 times the heat transmission coefficient before the compression.

In some embodiments, when the aerogel composite is compressed under application of a pressure of 3 bar, 9 bar, and 24 bar in a horizontal direction (transverse direction) with respect to a cross-section of the aerogel composite, the heat transmission coefficient after the compression may be greater than 1 time to equal to or less than 1.8 times the heat transmission coefficient before the compression.

In some embodiments, with respect to the aerogel composite, the heat transmission coefficient before and after compression may satisfy Equation 4 below:

{(Heat transmission coefficient (*a*) before and after compression−Average value (*b*) of heat transmission coefficients before and after compression)}=(Average value (*b*) of heat transmission coefficients before and after compression)×*A*    [Equation 4]

In Equation 4 above, the heat transmission coefficient (a) before and after compression indicates the heat transmission coefficient obtained after compression under application of 0 bar, 3 bar, 9 bar, and 24 bar in a horizontal direction (transverse direction) with respect to a cross-section of the aerogel composite, the average value (b) of heat transmission coefficients before and after compression indicates the average value of heat transmission coefficients of the aerogel composite with no compression, and heat transmission coefficients obtained after compression with a pressure value of 3 bar, 9 bar, and 24 bar in a horizontal direction (transverse direction) with respect to a cross-section of the aerogel composite, and A is a rational number of from −0.40 to +0.40.

In some embodiments, with respect to the aerogel composite, the heat transmission coefficient before and after compression may satisfy Equation 4 below:

{(Heat transmission coefficient (*a*) before and after compression−Average value (*b*) of heat transmission coefficients before and after compression)}=(Average value (*b*) of heat transmission coefficients before and after compression)×A    [Equation 4]

In Equation 4 above, the heat transmission coefficient (a) before and after compression indicates the heat transmission coefficient obtained after compression under application of 0 bar, 3 bar, or 9 bar in a horizontal direction (transverse direction) with respect to a cross-section of the aerogel composite, the average value (b) of heat transmission coefficients before and after compression indicates the average value of heat transmission coefficients of the aerogel composite under no application of pressure, and heat transmission coefficients obtained after compression with a pressure value of 3 bar, and 9 bar in a horizontal direction (transverse direction) with respect to a cross-section of the aerogel composite, and A is a rational number of from −0.23 to +0.23.

In some embodiments, the heat transmission coefficient obtained after compression with a pressure of 3 bar, 9 bar, and 24 bar in a horizontal direction (transverse direction) with respect to a cross-section of the aerogel composite may satisfy Equation 5 below:

(Heat transmission coefficient (c) after compression− Average value (d) of heat transmission coefficients after compression)=(Average value (d) of heat transmission coefficients after compression)×B   [Equation 5]

In Equation 5 above, the heat transmission coefficient (c) after compression indicates the heat transmission coefficient obtained after compression with a pressure of 3 bar, 9 bar, or 24 bar in the horizontal direction (transverse direction) with respect to the cross-section of the aerogel composite, the average value (d) of heat transmission coefficients after compression indicates the average value of heat transmission coefficients obtained after compression with a pressure of each of 3 bar, 9 bar, and 24 bar in the horizontal direction (transverse direction) with respect to the cross-section of the aerogel composite, and B is a rational number of from −0.30 to +0.30.

In some embodiments, with respect to the aerogel composite, a change rate (C) of heat transmission coefficient after compression per unit application pressure represented by Equation 6 below may be a rational number of from −0.15 to +0.15:

C=(heat transmission coefficient after compression with a pressure of x−heat transmission coefficient after compression with a pressure of y)/(x−y)   [Equation 6]

In Equation 6 above, x and y are each independently 3 bar or 24 bar, but are different pressure values.

In some embodiments, when the aerogel composite is under application of a pressure of 3 bar, 9 bar, and 24 bar in a horizontal direction (transverse direction) with respect to a cross-section of the aerogel composite, the compression recovery rate represented by Equation 2 below may be 60% or greater:

Compression recovery rate (%)={(Cross-sectional thickness of aerogel composite after compression)/(Cross-sectional thickness of aerogel composite before compression)}×100   [Equation 2]

In some embodiments, the aerogel may include pores having a pore diameter of 30 nm or less at 30% to 45% of the pore volume of a skeletal structure.

In some embodiments, the aerogel may be formed of silica, methylsilylated silica, dimethylsilylated silica, trimethylsilylated silica, or a mixture thereof.

In some embodiments, the aerogel particles may include particles in which a plurality of aerogel particles having a particle diameter of greater than 0 to 5 nm or less are aggregated or bonded.

In some embodiments, the aggregated or bonded particles may have an average particle diameter of 5 to 2,000 nm.

In some embodiments, the fiber substrate may be formed of glass fiber.

In some embodiments, the aerogel composite may have a thickness of 0.5 mm to 20 mm.

In some embodiments, the aerogel composite may have a density of 0.05 to 0.50 g/cm$^3$.

In some embodiments, the aerogel composite may have a compressive strength of 20 kPa to 80 kPA at 10% deformation and a tensile strength of 30 N/cm$^2$ to 60 N/cm$^2$.

In accordance with another exemplary embodiment of the present disclosure, a thermal insulation member includes the aerogel composite provided in the present disclosure.

In some embodiments, the thermal insulation member may further include a support member positioned on at least one of an upper surface or a lower surface of the aerogel composite.

BRIEF DESCRIPTION OF THE DRAWINGS

Exemplary embodiments can be understood in more detail from the following description taken in conjunction with the accompanying drawings, in which:

FIG. 1 shows a graph derived from small angle X-ray diffraction (SAXS) analysis for aerogel powder (particles) separated from aerogel composites of Examples 1 and 3 in Experimental Example 2, and the aerogel composite of Example 1; and FIG. 2 shows a graph derived from small angle X-ray diffraction (SAXS) analysis for aerogel powder (particles) separated from aerogel composites of Comparative Examples 1 and 2 in Experimental Example 2.

DETAILED DESCRIPTION OF EMBODIMENTS

Hereinafter, the present disclosure will be described in detail to aid in understanding of the present disclosure. As used herein, it will be understood that words or terms used in the specification and claims of the present disclosure shall not be construed as being limited to having the meaning defined in commonly used dictionaries. It will be further understood that the words or terms should be interpreted as having meanings that are consistent with their meanings in the context of the relevant art and the technical idea of the invention, based on the principle that an inventor may properly define the meaning of the words or terms to best explain the invention.

According to an embodiment of the present disclosure, an aerogel composite includes a fiber substrate, and an aerogel including a plurality of open pores.

In the present disclosure, an "aerogel" includes a plurality of primary aerogel particles having a size of approximately greater than 0 to 10 nm or less, greater than 0 to 5 nm or less, and secondary aerogel particles in which the primary aerogel particles are aggregated or bonded, and forms an aggregate in which a plurality of open pores are formed between the primary aerogel particles and the secondary aerogel particles to have a three-dimensional network structure.

In the present disclosure, the aerogel may be an inorganic silica aerogel formed from a silicon alkoxide-based compound or water glass as a precursor. In some embodiments, the aerogel may be formed of silica, methylsilylated silica, dimethylsilylated silica, trimethylsilylated silica, or a mixture thereof. As another example, in the aerogel, at least a portion of $SiO_2$ on a surface of the $SiO_2$ network structure may have a bonding structure of Si—O—$SiO_2(CH_3)$, Si—O—$SiO(CH_3)_2$, or Si—O—$Si(CH_3)_3$. A specific process for producing a silica aerogel will be described in detail below.

In the present disclosure, aerogel particles may be placed on a fiber substrate and in the voids between neighboring fiber substrates. In the present disclosure, the "aerogel particles" are particles in the form of an individual solid unit constituting an aerogel, and may include both primary aerogel particles having a size of approximately greater than 0 to 10 nm or less, or greater than 0 to 5 nm or less, preferably around 1 nm, and secondary aerogel particles formed through aggregation of the primary aerogel particles. However, the aerogels in an aerogel composite are mostly the secondary aerogel particles or in the form that the secondary aerogel particles are aggregated and bonded, and the aerogels may have a small amount of primary aerogel particles that are not formed to be secondary aerogel particles mixed therein. The secondary aerogel particles may have an average particle diameter of approximately 5 nm to 2,000 nm, 5 nm to 1000 nm, 5 nm to 500 nm, 5 nm to 100 nm, or 5 nm to 50 nm, but are not limited thereto. In the present disclosure, the average particle size may be measured by any means known to those skilled in the art, such as scanning electron microscopy, dynamic light scattering, optical microscopy, size exclusion, or the like, but is not limited thereto.

In general, the aerogel particles (secondary aerogel particles) may be prepared to be disk-like, sphere-like, cocoon-like, rod-like, or irregular, and the aerogel composite provided in the present disclosure contains a high proportion of oblate disk-like secondary aerogel particles having a convex portion at the center, thereby increasing the pore ratio in the aerogel composite, thereby improving both strength and elastic recovery rate in the three-dimensional network structure of the aerogel, and accordingly, when applied as a thermal insulation material to battery modules and the like, the aerogel composite maintains excellent recovery and insulating properties even when compressed due to the expansion of surrounding devices.

In relation to what is described above, small angle X-ray scattering (SAXS) analysis was performed to analyze the structural characteristics of the aerogel particles of the present disclosure.

In the present disclosure, the "small angle X-ray scattering (SAXS)" indicates a method of analysis designed to obtain structural information of materials by irradiating a target material with X-rays and measuring the scattered X-rays at a small scattering angle. This is achieved by analyzing the elastic scattering behavior of X-rays when travelling through the material, recording the scattering thereof at small angles (typically 0.1~10°, hence the "small-angle" in its name). This belongs to the family of small-angle scattering (SAS) techniques along with small-angle neutron scattering, and is typically performed using hard X-rays with a wavelength of 0.07~0.2 nm. Depending on the angular range in which a clear scattering signal may be recorded, SAXS is capable of delivering structural information of dimensions between 1 and 100 nm, and of repeat distances in partially ordered systems of up to 150 nm.

In addition, in the present disclosure, the "small angle X-ray scattering (SAXS) graph" shows the wave number dependence of a scattering intensity I in a scattering angle (2θ) ranging from 10° or less in scattered X-rays that are incident on the aerogel composite or aerogel particles and scattered by the aerogel particles. In the present disclosure, the scattering angle 2θ may be adjusted by varying the spacing distance between the sample and the detector. In addition, in the present disclosure, the small angle X-ray scattering graph shows scattering intensity I as a function of wave number Q (unit: Å-1), and in this case, the wave number Q is calculated from $4\pi \sin\theta/\lambda$, and λ represents the wavelength of X-rays.

As a result of performing the small angle X-ray scattering (SAXS) analysis on the aerogel composite of the present disclosure, preferably the aerogel particles contained in the aerogel composite, a graph where the scattering intensity versus the wave number is represented logarithmically may be obtained, and in this graph, the slope at a wave number ranging from 0.015/Å to 0.035/Å is from −2.80 to −2.20, from −2.70 to −2.20, from −2.60 to −2.20, from −2.55 to −2.20, or from −2.50 to −2.20. In this case, the slope is shown by calculating the change value in scattering intensity according to changes in wave number, in linear regression obtained in the wave number ranging from 0.015/Å to 0.035/Å using the method of least squares. In some embodiments, the slope at a wave number ranging from 0.015/Å to 0.035/Å is from −2.80 to −2.20.

FIG. 1 shows a graph where the scattering intensity versus the wave number obtained by performing the small angle X-ray scattering (SAXS) analysis on aerogel powder (aerogel particles) separated from the aerogel composite or the aerogel composite according to an embodiment of the present disclosure is represented logarithmically, and the graph shows that in the aerogel particles according to the present disclosure or the aerogel composite containing the same, the slope is in the ranging from −2.80 to −2.20 in the wavenumber ranging from 0.015/Å to 0.035/Å.

The aerogel composite according to the present disclosure contains a high proportion of secondary aerogel particles having an oblate-like structure compared to typical aerogel composites, and thus has a greater absolute value of the slope in the wave number ranging from 0.015/Å to 0.035/Å of the small angle X-ray scattering (SAXS) graph than the typical aerogel composites. The aerogel composite according to the present disclosure has a high void ratio for the reasons described above, and as will be described later, has high strength, elastic recovery rate, and compression recovery rate in the three-dimensional network structure of aerogel and shows no significant increase in the heat transmission coefficient after compression.

In the present disclosure, the small angle X-ray scattering (SAXS) analysis may be performed on the aerogel composite provided in the present disclosure or the aerogel powder (aerogel particles) separated from the aerogel composite. In this case, when the small angle X-ray scattering (SAXS) analysis is performed on the aerogel composite, the small angle X-ray scattering (SAXS) graph according to the above analysis may relate to aerogel particles attached or bonded to a fiber substrate, or contained in an aerogel network structure as the aerogel particles substantially contained in the aerogel composite.

In some embodiments, the small angle X-ray scattering (SAXS) graph may be obtained by performing the small angle X-ray scattering (SAXS) analysis on the aerogel powder (aerogel particles) separated from the aerogel composite.

In this case, the aerogel powder may be obtained from an aerogel composite prepared in a rectangular shape (e.g., the size may be 60 cm×12 cm in width and length but is not limited thereto) or from a specimen piece obtained by cutting a portion of the aerogel composite.

The aerogel powder used for analysis in the present disclosure may be prepared through the following process: An aerogel composite having a size of 60 cm×12 cm in width and length was placed in a sealed container and shaken up and down repeatedly to apply shocks, thereby inducing separation of the aerogel powder. In order to remove a fiber substrate mixed in the separated aerogel powder, the fiber substrate that was visible to the naked eye was first removed with tweezers. Thereafter, the aerogel powder was placed in a 100 ml vial, and distilled water was added thereto at a weight ratio of approximately 1:130 (powder:distilled water), and the mixture was shaken vigorously 50 times. As a result, the fiber substrate that settled in the bottom layer of the vial and the aggregated mass formed through the aggregation of the fiber substrate and the aerogel powder were removed, and only the aerogel powder floating in the upper layer of distilled water was carefully obtained. The obtained aerogel powder was dried at 120° C. for 1 hour and used in the experiments herein. In this case, for sufficient analysis, the aerogel powder sample which is obtained in the end is required to be in an amount of at least 10 mg.

In some embodiments, the small angle X-ray scattering (SAXS) graph may be obtained by performing the small angle X-ray scattering (SAXS) analysis on specimens of the aerogel composite. In this case, the specimens may have a square shape in a size of 1 cm×1 cm in width and length. In the present disclosure, when the small angle X-ray scattering (SAXS) analysis is performed on a specimen of the aerogel composite as described above, the slope of the small angle X-ray scattering (SAXS) graph may be shown as the average value of the slopes measured in the wave number ranging from 0.015/Å to 0.035/Å in the graph obtained for each specimen after obtaining five specimens from the same aerogel composite and performing the small angle X-ray scattering (SAXS) analysis on all five specimens. In this case, as for the five specimens, four specimens may be obtained by ensuring that a position 10 cm away from each corner of the aerogel composite prepared in a rectangular shape in the center direction is placed right in the middle of the specimen, and one specimen may be obtained by ensuring that the portion right in the middle of the aerogel composite is also placed right in the middle of the specimen.

In some embodiments, the small angle X-ray scattering (SAXS) graph is obtained as a result of the small angle X-ray scattering (SAXS) analysis on the aerogel powder separated from the aerogel composite of the present disclosure, and the slope in the wave number ranging from 0.015/Å to 0.035/Å may be from −2.80 to −2.20, from −2.70 to −2.20, or from −2.60 to −2.20.

In some embodiments, the small angle X-ray scattering (SAXS) graph is obtained as a result of the small angle X-ray scattering (SAXS) analysis on the aerogel composite of the present disclosure or the aerogel particles included in the aerogel composite or some specimens of the aerogel composite of the present disclosure, and the slope in the wave number ranging from 0.015/Å to 0.035/Å may be from −2.80 to −2.20, from −2.70 to −2.20, or from −2.60 to −2.20.

In the present disclosure, the small angle X-ray scattering (SAXS) analysis was performed by transmitting X-rays through the specimens and measuring the scattering intensity (I(q)) according to the scattering wave number (Q), using Xeuss 2.0 X-ray scattering equipment from Xenocs. More specifically, in the small angle X-ray scattering (SAXS) analysis, the specimens were placed 2.5 m away from a detector and measured by incident X-rays, and Pilatus3 300K (2D detector) was used as the detector. Then, the scattered 2D diffraction pattern was obtained as an image, and this was calibrated using the sample-to-detector distance obtained through a standard specimen, and then, the 2D diffraction pattern obtained through the specimen analysis was used to calculate the scattering intensity (I(q)) according to the scattering wave number (Q) through circular averaging.

$$Q = 4\pi \sin\theta / \lambda \qquad \text{[Equation 1]}$$

In Formula 1 above,

Q indicates the scattering wave number (vector), θ indicates half of the scattering angle, and λ indicates the wavelength of the incident X-ray.

The aerogel composite having the characteristics described above in the present disclosure has excellent elasticity, flexibility, and strength, and thus, has excellent elastic recovery force even when the aerogel composite is compressed and deformed under a pressurization environment, and may maintain a high level of thermal insulation properties.

In the present disclosure, the aerogel may have a skeletal structure including mesopores, and may include micropores or macropores in addition to the mesopores. Here, the "mesopore" is a pore having an average pore diameter in the range of approximately 2 nm to approximately 50 nm, the "macropore" is a pore having an average pore diameter in the range of greater than approximately 50 nm, and the "micropore" is a pore having an average pore diameter in the range of less than approximately 2 nm. In the present disclosure, the aerogel may include mesopores of at least 50%, at least 60%, at least 70%, at least 80%, at least 90%, at least 95%, at least 96%, at least 97%, at least 98%, at least 99%, or 100% of the pore volume of the skeletal structure. In an embodiment, the aerogel of the present disclosure may include mesopores. In an embodiment, the aerogel of the present disclosure may include mesopores and micropores. In the present disclosure, the pore size may be measured by any means known to those skilled in the art, such as a gas adsorption experiment, mercury infiltration, capillary flow porometry, positron annihilation lifetime spectroscopy (PALS), or the like, but is not limited thereto.

In an aerogel, pores having a pore diameter of 30 nm or less are not destroyed or have a low destruction rate even when the aerogel is compressed by a high pressure (for example, a pressure of 37 bar or less, 33 bar or less, or 30 bar or less). Accordingly, in the present disclosure, by allowing pores having a pore diameter of 30 nm or less to be included in an aerogel at a predetermined ratio, the heat transmission coefficient of an aerogel composite may be maintained within a predetermined range even under a pressurization environment compared to that before the pressurization.

Specifically, in the present disclosure, the aerogel may include pores having a pore diameter of greater than 0 to 30 nm or less at 25% or greater, 26% or greater, 27% or greater, 28% or greater, 29% or greater, 30% or greater, or 31% or greater of the pore volume of the skeletal structure, and may include the pores at 50% or less, 49% or less, 48% or less, 47% or less, 46% or less, 45% or less, 44% or less, 43% or less, 42% or less, 41% or less, or 40% or less, preferably 25% to 45%, 25% to 40%, 30% to 45%, or 30% to 40%, more preferably 30% to 45%, or 30% to 40%, but is not limited thereto. In some embodiments, the aerogel may include pores having a pore diameter of greater than 0 to 30 nm at 30% to 45% of the pore volume of the skeletal structure.

In addition, in the present disclosure, the aerogel may include pores having a pore diameter of greater than 30 nm at 50% or greater, 51% or greater, 52% or greater, 53% or greater, 54% or greater, 55% or greater, 56% or greater, 57% or greater, 58% or greater, 59% or greater, or 60% or greater of the pore volume of the skeletal structure, and may include the pores at 75% or less, 74% or less, 73% or less, 72% or less, 71% or less, 70% or less, or 69% or less, preferably 55% to 75%, 60% to 75%, 55% to 70%, or 60% to 70%, more preferably 55% to 70%, or 60% to 70%, but is not limited thereto.

In the present disclosure, the porosity of the aerogel may be 80% or greater, 85% or greater, 88% or greater, 89% or greater, 90% or greater, 91% or greater, 92% or greater, 93% or greater, 94% or greater, 95% or greater, 96% or greater, 97% or greater, 98% or greater, or 99% or greater, preferably 80% or greater, or 99.9% or less, but is not limited thereto.

The aerogel composite of the present disclosure has a structure in which at least some of a plurality of aerogel particles are dispersed, preferably combined, on the surface of a substrate including a fiber, and at the same time, has a structure in which at least some of the plurality of aerogel particles are dispersed, preferably positioned, in an empty space between discrete fibers in the substrate. In the present disclosure, examples of the above substrate may be discrete fibers, a film, a sheet, a net, a fiber, a porous body, a foam, a non-woven body, or a laminate of two or more layers thereof. In addition, depending on the application thereof, the substrate may have surface roughness formed or patterned on the surface thereof.

In the present disclosure, the fiber substrate may be polyester, polyolefin terephthalate, poly(ethylene) naphthalate, polycarbonate (e.g., rayon, nylon), cotton (e.g., Lycra® manufactured by DuPont), carbon (e.g., graphite), polyacrylonitrile (PAN), oxidized PAN, non-carbonized heat-treated PAN (such as those made of SGL carbon), a glass fiber-based material (S-glass, 901 glass, 902 glass, 475 glass, E-glass, etc.), a silica-based fiber such as Quartz (e.g., Quartzel® manufactured by Saint-Gobain), Q-Fiber® felt (manufactured by Jones Manville), Saffil (manufactured by Saffil), Durablanket (manufactured by Unifrax) and other silica fibers, Duraback® (manufactured by Carborundum), a polyaramid fiber such as Kevlar®, Nomex®, and Sontera® (all manufactured by DuPont), CONEX (manufactured by Taijin), a polyolefin such as Tyvek® (manufactured by DuPont), Dyneema (manufactured by DSM), Spectra® (manufactured by Honeywell), other polypropylene fibers such as Typar® and Xavan® (both manufactured by DuPont), a fluoropolymer such as PTFE under the trade name Teflon® (manufactured by DuPont), Goretex® (manufactured by W. L. GORE), a silicon carbide fiber such as NICALCON (manufactured by COI Ceramics), a ceramic fiber such as NEXTEL (manufactured by 3M), an acrylic polymer, wool, silk, hemp, leather, a suede fiber, a PBO fiber Zylong® (manufactured by Toyobo), a liquid crystal material such as VECTAN (manufactured by Hoechst), a cambrel fiber (manufactured by DuPont), polyurethane, polyamide, a wool fiber, boron, aluminum, iron, a stainless steel fiber and other thermoplastic resins such as PEEK, PES, PET, PEK, PPS, and the like, but any fiber may be used without limitation as long as it is a fiber which includes spaces or voids into which an aerogel may be easily inserted, thereby improving heat insulation performance. For example, the fiber substrate may be formed of glass fiber.

In the present disclosure, the fiber substrate may have a thickness of 0.5 to 20 mm, but is not limited thereto.

In the present disclosure, the aerogel composite may have a density of 0.05 to 0.50 g/cm$^3$, 0.05 to 0.35 g/cm$^3$, 0.05 to 0.30 g/cm$^3$, 0.10 to 0.30 g/cm$^3$, or 0.15 to 0.30 g/cm$^3$, but is limited thereto.

As described above, the aerogel composite provided in the present disclosure has excellent elasticity, flexibility, and strength, and thus, has excellent elastic recovery force even when the aerogel composite is compressed and deformed under a pressurization environment, and may maintain a high level of thermal insulation properties.

In the present disclosure, when the aerogel composite is under application of a pressure of 1 bar or greater, 2 bar or greater, 3 bar or greater, 4 bar or greater, 5 bar or greater, 6 bar or greater, 7 bar or greater, 8 bar or greater, 9 bar or greater, 10 bar or greater, 15 bar or greater, 20 bar or greater, 25 bar or greater, 30 bar or greater, 35 or greater, or 40 bar or greater, and 50 bar or less, 45 bar or less, 40 bar or less, 35 bar or less, 30 bar or less, 25 bar or less, 20 bar or less, 15 bar or less, 10 bar or less, 9 bar or less, 8 bar or less, 7 bar or less, 6 bar or less, 5 bar or less, 4 bar or less, 3 bar or less, or 2 bar or less in a horizontal direction (transverse direction) with respect to a cross-section of the aerogel composite, the compression recovery rate may be 45% or greater, 50% or greater, 55% or greater, 60% or greater, 62% or greater, 64% or greater, 66% or greater, 68% or greater, 70% or greater, 72% or greater, 74% or greater, 76% or greater, 78% or greater, 80% or greater, 82% or greater, 84% or greater, 86% or greater, 88% or greater, 90% or greater, 92% or greater, 94% or greater, 95% or greater, 96% or greater, 97% or greater, 98% or greater, or 99% or greater. In some embodiments, the compression recovery rate may be 60% or greater.

In the present disclosure, as shown in Equation 2 below, the "compression recovery rate" indicates the percentage of the cross-sectional thickness of the aerogel composite after a predetermined time has elapsed after compression compared to the cross-sectional thickness of the aerogel composite before the compression. Here, the predetermined time may be, for example, 1 second or more, 5 seconds or more, 10 seconds or more, 30 seconds or more, 1 minute or more, 5 minutes or more, 10 minutes or more, 20 minutes or more, 30 minutes or more, 40 minutes or more, 50 minutes or more, 1 hour or more, 2 hours or more, 4 hours or more, 6 hours or more, 8 hours or more, 10 hours or more, 12 hours or more, 24 hours or more, 48 hours or more, or 96 hours or more, but is not limited thereto. In some embodiments, the recovery rate after compression may be measured 60 minutes (1 hour) after compressing the aerogel composite.

$$\text{Compression recovery rate (\%)} = \{(\text{Cross-sectional thickness of aerogel composite after compression})/(\text{Cross-sectional thickness of aerogel composite before compression})\} \times 100 \quad \text{[Equation 2]}$$

In the present disclosure, the "pressure" value means the value of a pressure actually applied to a unit area of the aerogel composite when a pressure is applied in the horizontal direction (transverse direction) with respect to the cross-section of the aerogel composite using a press device or the like. In some embodiments, when a pressure is applied in the horizontal direction (transverse direction) with respect to the cross-section of the aerogel composite using a press device including a cylinder, the actual pressure value may mean, as shown in Equation 3 below, a value obtained by dividing the product of a cross-sectional area of the cylinder and a set pressure value by the area of a specimen, but is not limited thereto, and may be calculated differently depending on each device or as set by a manufacturer.

$$\text{Actual pressure value} = (\text{Radius of inner diameter (cm) of cylinder of press equipment} \times \text{Radius of inner diameter (cm) of cylinder of press equipment} \times 3.14 \times \text{set pressure value})/(\text{Area(cm}^2\text{) of specimen}) \quad \text{[Equation 3]}$$

In the present disclosure, applying pressure in the horizontal direction (transverse direction) with respect to the cross-section of the aerogel composite indicates applying pressure to the aerogel composite in a direction from an upper surface to a lower surface of the aerogel composite or in a direction from a lower surface to an upper surface, that is, in the thickness direction.

In the present disclosure, the time during which a pressure is applied to the aerogel composite is not particularly limited, but may be, for example, 1 second or more, 5 seconds or more, 10 seconds or more, 30 seconds or more, 1 minute or more, 5 minutes or more, 10 minutes or more, 20 minutes or more, 30 minutes or more, 40 minutes or more, 50 minutes or more, 1 hour or more, or 2 hours or more, and 24 hours or less, 12 hours or less, 10 hours or less, 8 hours or less, 6 hours or less, 4 hours or less, 2 hours or less, 1 hour or less, 50 minutes or less, 40 minutes or less, 30 minutes or less, 20 minutes or less, 10 minutes or less, 5 minutes or less, 1 minute or less, 30 seconds or less, 10 seconds or less, or 5 seconds or less, but is not limited thereto. In some embodiments, the time during which the pressure is applied may be 10 minutes.

In some embodiments, when the aerogel composite is under application of a pressure of 3 bar, 9 bar, 15 bar, 24 bar, 30 bar, or 33 bar in the horizontal direction (transverse direction) with respect to the cross-section of the aerogel composite, the compression recovery rate may be 45% or greater, 50% or greater, 55% or greater, 60% or greater, 62% or greater, 64% or greater, 66% or greater, 68% or greater, 70% or greater, 72% or greater, 74% or greater, 76% or greater, 78% or greater, 80% or greater, 82% or greater, 84% or greater, 86% or greater, 88% or greater, 90% or greater, 92% or greater, 94% or greater, 95% or greater, 96% or greater, 97% or greater, 98% or greater, or 99% or greater.

In some embodiments, when the aerogel composite is under application of a pressure of 3 bar or greater in the horizontal direction (transverse direction) with respect to the cross-section of the aerogel composite, the compression recovery rate may be 70% or greater, 72% or greater, 74% or greater, 76% or greater, 78% or greater, 80% or greater, 82% or greater, 84% or greater, 86% or greater, 88% or greater, 90% or greater, 92% or greater, 94% or greater, 95% or greater, 96% or greater, 97% or greater, 98% or greater, or 99% or greater.

In some embodiments, when the aerogel composite is under application of a pressure of 5 bar or greater, 10 bar or greater, 15 bar or greater, 20 bar or greater, 25 bar or greater, 30 bar or greater, or 35 bar or greater in the horizontal direction (transverse direction) with respect to the cross-section of the aerogel composite, the compression recovery rate may be 60% or greater, 62% or greater, 64% or greater, 66% or greater, 68% or greater, 70% or greater, 72% or greater, 74% or greater, 76% or greater, 78% or greater, 80% or greater, 82% or greater, 84% or greater, 86% or greater, 88% or greater, 90% or greater, 92% or greater, 94% or greater, 95% or greater, 96% or greater, 97% or greater, 98% or greater, or 99% or greater.

In some embodiments, when the aerogel composite is under application of a pressure of 3 bar in the horizontal direction (transverse direction) with respect to the cross-section of the aerogel composite, the compression recovery may be 70% or greater, 72% or greater, 74% or greater, 76% or greater, 78% or greater, 80% or greater, 82% or greater, 84% or greater, 86% or greater, 88% or greater, 90% or greater, 92% or greater, 94% or greater, 95% or greater, 96% or greater, 97% or greater, 98% or greater, or 99% or greater, preferably 70% or greater, 72% or greater, 74% or greater, 76% or greater, 78% or greater, 80% or greater, 82% or greater, 84% or greater, 86% or greater, 88% or greater, 90% or greater, or 92% or greater, more preferably 84% or greater, or 86% or greater.

In some embodiments, when the aerogel composite is under application of a pressure of 9 bar in the horizontal direction (transverse direction) with respect to the cross-section of the aerogel composite, the compression recovery rate may be 60% or greater, 62% or greater, 64% or greater, 66% or greater, 68% or greater, 70% or greater, 72% or greater, 74% or greater, 76% or greater, 78% or greater, 80% or greater, 82% or greater, 84% or greater, 86% or greater, 88% or greater, 90% or greater, 92% or greater, 94% or greater, 95% or greater, 96% or greater, 97% or greater, 98% or greater, or 99% or greater, preferably 60% or greater, 62% or greater, 64% or greater, 66% or greater, 68% or greater, 70% or greater, 72% or greater, 74% or greater, 76% or greater, 78% or greater, 80% or greater, 82% or greater, 84% or greater, 86% or greater, 88% or greater, 90% or greater, or 92% or greater, more preferably 72% or greater, 74% or greater, 76% or greater, or 78% or greater.

In some embodiments, when the aerogel composite is under application of a pressure of 15 bar in the horizontal direction (transverse direction) with respect to the cross-section of the aerogel composite, the compression recovery rate may be 55% or greater, 60% or greater, 62% or greater, 64% or greater, 66% or greater, 68% or greater, 70% or greater, 72% or greater, 74% or greater, 76% or greater, 78% or greater, 80% or greater, 82% or greater, 84% or greater, 86% or greater, 88% or greater, 90% or greater, 92% or greater, 94% or greater, 95% or greater, 96% or greater, 97% or greater, 98% or greater, or 99% or greater, preferably 60% or greater, 62% or greater, 64% or greater, 66% or greater, 68% or greater, 70% or greater, 72% or greater, 74% or greater, 76% or greater, 78% or greater, 80% or greater, 82% or greater, 84% or greater, 86% or greater, 88% or greater, 90% or greater, or 92% or greater, more preferably 70% or greater, 72% or greater, 74% or greater, or 76% or greater.

In some embodiments, when the aerogel composite is under application of a pressure of 24 bar in the horizontal direction (transverse direction) with respect to the cross-section of the aerogel composite, the compression recovery rate may be 55% or greater, 60% or greater, 62% or greater, 64% or greater, 66% or greater, 68% or greater, 70% or greater, 72% or greater, 74% or greater, 76% or greater, 78% or greater, 80% or greater, 82% or greater, 84% or greater, 86% or greater, 88% or greater, 90% or greater, 92% or greater, 94% or greater, 95% or greater, 96% or greater, 97% or greater, 98% or greater, or 99% or greater, preferably 60% or greater, 62% or greater, 64% or greater, 66% or greater, 68% or greater, 70% or greater, 72% or greater, 74% or greater, 76% or greater, 78% or greater, 80% or greater, 82% or greater, 84% or greater, 86% or greater, 88% or greater, 90% or greater, or 92% or greater, more preferably 70% or greater, or 72% or greater.

In some embodiments, when the aerogel composite is under application of a pressure of 30 bar in the horizontal direction (transverse direction) with respect to the cross-section of the aerogel composite, the compression recovery rate may be 53% or greater, 55% or greater, 60% or greater, 62% or greater, 64% or greater, 66% or greater, 68% or greater, 70% or greater, 72% or greater, 74% or greater, 76% or greater, 78% or greater, 80% or greater, 82% or greater, 84% or greater, 86% or greater, 88% or greater, 90% or greater, 92% or greater, 94% or greater, 95% or greater, 96% or greater, 97% or greater, 98% or greater, or 99% or greater, preferably 60% or greater, 62% or greater, 64% or greater, 66% or greater, 68% or greater, 70% or greater, 72% or greater, 74% or greater, 76% or greater, 78% or greater, 80% or greater, 82% or greater, 84% or greater, 86% or greater, 88% or greater, 90% or greater, or 92% or greater, more preferably 68% or greater, 70% or greater, 72% or greater, 74% or greater, or 76% or greater.

In some embodiments, when the aerogel composite is under application of a pressure of 33 bar in the horizontal direction (transverse direction) with respect to the cross-section of the aerogel composite, the compression recovery rate may be 53% or greater, 55% or greater, 60% or greater, 62% or greater, 64% or greater, 66% or greater, 68% or greater, 70% or greater, 72% or greater, 74% or greater, 76% or greater, 78% or greater, 80% or greater, 82% or greater, 84% or greater, 86% or greater, 88% or greater, 90% or greater, 92% or greater, 94% or greater, 95% or greater, 96% or greater, 97% or greater, 98% or greater, or 99% or greater, preferably 60% or greater, 62% or greater, 64% or greater, 66% or greater, 68% or greater, 70% or greater, 72% or greater, 74% or greater, 76% or greater, 78% or greater, 80% or greater, 82% or greater, 84% or greater, 86% or greater, 88% or greater, 90% or greater, or 92% or greater, more preferably 68% or greater, 70% or greater, 72% or greater, 74% or greater, or 76% or greater.

In some embodiments, when the aerogel composite is under application of a pressure of 37 bar in the horizontal direction (transverse direction) with respect to the cross-section of the aerogel composite, the compression recovery rate may be 50% or greater, 55% or greater, 60% or greater, 62% or greater, 64% or greater, 66% or greater, 68% or greater, 70% or greater, 72% or greater, 74% or greater, 76% or greater, 78% or greater, 80% or greater, 82% or greater, 84% or greater, 86% or greater, 88% or greater, 90% or greater, 92% or greater, 94% or greater, 95% or greater, 96% or greater, 97% or greater, 98% or greater, or 99% or greater, preferably 55% or greater, 60% or greater, 62% or greater, 64% or greater, 66% or greater, 68% or greater, 70% or greater, 72% or greater, 74% or greater, 76% or greater, 78% or greater, 80% or greater, 82% or greater, 84% or greater, 86% or greater, 88% or greater, 90% or greater, or 92% or greater, more preferably 55% or greater, 60% or greater, or 62% or greater.

In the present disclosure, the thickness of the aerogel composite before compression may be 20 mm or less, 15 mm or less, 14 mm or less, 13 mm or less, 12 mm or less, 11 mm or less, 10 mm or less, 9 mm or less, 8 mm or less, 7 mm or less, 6 mm or less, 5 mm or less, 4 mm or less, 3 mm or less, 2 mm or less, or 1 mm or less, and 0.5 mm or greater, 1 mm or greater, or 2 mm or greater, and the thickness may be suitably adjusted by adjusting the thickness of a substrate or the amount of aerogel sol impregnated into the substrate according to the application use of the aerogel composite.

In the present disclosure, when the aerogel composite is under application of a pressure of 1 bar or greater, 2 bar or greater, 3 bar or greater, 4 bar or greater, 5 bar or greater, 6 bar or greater, 7 bar or greater, 8 bar or greater, 9 bar or greater, 10 bar or greater, 15 bar or greater, 20 bar or greater, 25 bar or greater, 30 bar or greater, 35 or greater, or 40 bar or greater, and 50 bar or less, 45 bar or less, 40 bar or less, 35 bar or less, 30 bar or less, 25 bar or less, 20 bar or less, 15 bar or less, 10 bar or less, 9 bar or less, 8 bar or less, 7 bar or less, 6 bar or less, 5 bar or less, 4 bar or less, 3 bar or less, or 2 bar or less in the horizontal direction (transverse direction) with respect to the cross-section of the aerogel composite, the heat transmission coefficient after compression may be 3 times or less, 2.9 times or less, 2.8 times or less, 2.7 times or less, 2.6 times or less, 2.5 times or less, 2.4 times or less, 2.3 times or less, 2.2 times or less, 2.1 times or less, 2 times or less, 1.9 times or less, 1.8 times or less, 1.7 times or less, 1.6 times or less, 1.5 times or less, 1.4 times or less, 1.3 times or less, 1.2 times or less, 1.1 times or less, 1.05 times or less, 1.04 times or less, 1.03 times or less, 1.02 times or less, or 1.01 times or less, and additionally, 1 time or greater, or greater than 1 time the heat transmission coefficient before compression.

In the present disclosure, the "heat transmission coefficient" refers to the transfer of heat from an air layer to an air layer through a solid object, and indicates the amount of heat flowing when a cross-sectional area of 1 m$^2$ is at a temperature difference of 1° C. per unit time, which is a value obtained by dividing the thermal conductivity of an object. The amount of heat transfer of an object is affected by the thermal conductivity and thickness of the object, and the greater the thermal conductivity and the thinner the thickness, the greater the amount of heat transfer. Therefore, in order to achieve good thermal insulation performance, the thermal conductivity is required to be small and the thickness is required to be large. However, when a pressure is applied to an elastic object, such as an aerogel composite, the thermal conductivity may change after the pressurization, and the thickness may also change. That is, unless the object is a completely elastic material, the thickness thereof inevitably decreases after the pressurization, but if the thermal conductivity does not change, the total amount of heat transfer increases due to the thickness reduction. That is, it is inevitable that the thermal insulation performance will be degraded. Therefore, whether the thermal insulation performance is maintained after the pressurization is not confirmed only with the thermal conductivity after the pressurization, but confirmed with the heat transmission coefficient, which considers both the thermal conductivity after pressurization and the thickness after pressurization. Even if the thermal conductivity decreases or is maintained after pressurization, if the thickness is significantly reduced after the pressurization, the heat transmission coefficient and the total amount of heat transfer inevitably increase significantly.

The aerogel composite provided in the present disclosure does not change significantly in both thermal conductivity and thickness even after pressurization, so that the increase rate of heat transmission coefficient compared to that before the pressurization is not high, and the thermal insulation performance may be maintained at an excellent level without significant degradation even after the pressurization.

In the present disclosure, the "heat transmission coefficient after compression" indicates the ratio of thermal conductivity to a cross-sectional thickness of an aerogel composite measured after a predetermined time has elapsed after compression by applying a specific level of pressure to the aerogel composite in a horizontal direction (transverse direction) with respect to a cross-section of the aerogel composite. Here, the predetermined time may be, for example, 1 second or more, 5 seconds or more, 10 seconds or more, 30 seconds or more, 1 minute or more, 5 minutes or more, 10 minutes or more, 20 minutes or more, 30 minutes or more, 40 minutes or more, 50 minutes or more, 60 minutes or more, 2 hours or more, 4 hours or more, 6 hours or more, 8 hours or more, 10 hours or more, 12 hours or more, 24 hours or more, 48 hours or more, or 96 hours or more, but is not limited thereto. In some embodiments, the heat transmission coefficient after compression may be measured 60 minutes (1 hour) after compressing the aerogel composite.

In the present disclosure, the time during which a pressure is applied to the aerogel composite is not particularly limited, but may be, for example, 1 second or more, 5 seconds or more, 10 seconds or more, 30 seconds or more, 1 minute or more, 5 minutes or more, 10 minutes or more, 20 minutes or more, 30 minutes or more, 40 minutes or more, 50 minutes or more, 1 hour or more, or 2 hours or more, and 24 hours or less, 12 hours or less, 10 hours or less, 8 hours or less, 6 hours or less, 4 hours or less, 2 hours or less, 1 hour or less, 50 minutes or less, 40 minutes or less, 30 minutes or less, 20 minutes or less, 10 minutes or less, 5 minutes or less, 1 minute or less, 30 seconds or less, 10 seconds or less, or 5 seconds or less, but is not limited thereto. In some embodiments, the time during which the pressure is applied may be 10 minutes.

In some embodiments, when the aerogel composite is under application of a pressure of 3 bar or greater, 5 bar or greater, 10 bar or greater, 15 bar or greater, 20 bar or greater, 25 bar or greater, 30 bar or greater, or 35 bar or greater in the horizontal direction (transverse direction) with respect to the cross-section of the aerogel composite, the heat transmission coefficient after compression may be 3 times or less, 2.9 times or less, 2.8 times or less, 2.7 times or less, 2.6 times or less, 2.5 times or less, 2.4 times or less, 2.3 times or less, 2.2 times or less, 2.1 times or less, 2 times or less, 1.9 times or less, 1.8 times or less, 1.7 times or less, 1.6 times or less, 1.5 times or less, 1.4 times or less, 1.3 times or less, 1.2 times or less, 1.1 times or less, 1.05 times or less, 1.04 times or less, 1.03 times or less, 1.02 times or less, or 1.01 times or less the heat transmission coefficient before compression.

In some embodiments, when the aerogel composite is under application of a pressure of 3 bar, 9 bar, 15 bar, 24 bar, 30 bar, or 33 bar in the horizontal direction (transverse direction) with respect to the cross-section of the aerogel composite, the heat transmission coefficient after compression may be 3 times or less, 2.9 times or less, 2.8 times or less, 2.7 times or less, 2.6 times or less, 2.5 times or less, 2.4 times or less, 2.3 times or less, 2.2 times or less, 2.1 times or less, 2 times or less, 1.9 times or less, 1.8 times or less, 1.7 times or less, 1.6 times or less, 1.5 times or less, 1.4 times or less, 1.3 times or less, 1.2 times or less, 1.1 times or less, 1.05 times or less, 1.04 times or less, 1.03 times or less, 1.02 times or less, or 1.01 times or less the heat transmission coefficient before compression.

In some embodiments, when the aerogel composite is under application of a pressure of any one pressure value of 3 bar to 33 bar in the horizontal direction (transverse direction) with respect to the cross-section of the aerogel composite, the heat transmission coefficient after compression may be 2.0 times or less, 1.9 times or less, 1.8 times or less, 1.7 times or less, 1.6 times or less, 1.5 times or less, 1.4 times or less, 1.3 times or less, 1.2 times or less, 1.1 times or less, 1.05 times or less, 1.04 times or less, 1.03 times or less, 1.02 times or less, or 1.01 times or less the heat transmission coefficient before compression.

In some embodiments, when the aerogel composite is under application of a pressure of any one pressure value of 3 bar to 24 bar in the horizontal direction (transverse direction) with respect to the cross-section of the aerogel composite, the heat transmission coefficient after compression may be 1.8 times or less, 1.7 times or less, 1.6 times or less, 1.5 times or less, 1.4 times or less, 1.3 times or less, 1.2 times or less, 1.1 times or less, 1.05 times or less, 1.04 times or less, 1.03 times or less, 1.02 times or less, or 1.01 times or less the heat transmission coefficient before compression.

In some embodiments, when the aerogel composite is under application of a pressure of any one pressure value of 3 bar to 9 bar in the horizontal direction (transverse direction) with respect to the cross-section of the aerogel composite, the heat transmission coefficient after compression may be 1.7 times or less, 1.6 times or less, 1.5 times or less, 1.45 times or less, 1.4 times or less, 1.3 times or less, 1.2 times or less, 1.1 times or less, 1.05 times or less, 1.04 times or less, 1.03 times or less, 1.02 times or less, or 1.01 times or less the heat transmission coefficient before compression.

In some embodiments, when the aerogel composite is under application of a pressure of any one pressure value of 9 bar to 33 bar in the horizontal direction (transverse direction) with respect to the cross-section of the aerogel composite, the heat transmission coefficient after compression may be 1.8 times or less, 1.7 times or less, 1.6 times or less, 1.5 times or less, 1.4 times or less, 1.3 times or less, 1.2 times or less, 1.1 times or less, 1.05 times or less, 1.04 times or less, 1.03 times or less, 1.02 times or less, or 1.01 times or less the heat transmission coefficient before compression.

In some embodiments, when the aerogel composite is under application of a pressure of any one pressure value of 9 bar to 24 bar in the horizontal direction (transverse direction) with respect to the cross-section of the aerogel composite, the heat transmission coefficient after compression may be 1.7 times or less, 1.6 times or less, 1.5 times or less, 1.4 times or less, 1.3 times or less, 1.2 times or less, 1.1 times or less, 1.05 times or less, 1.04 times or less, 1.03 times or less, 1.02 times or less, or 1.01 times or less the heat transmission coefficient before compression.

In some embodiments, when the aerogel composite is under application of a pressure of any one pressure value of 15 bar to 33 bar in the horizontal direction (transverse direction) with respect to the cross-section of the aerogel composite, the heat transmission coefficient after compression may be 2.3 times or less, 2.2 times or less, 2.1 times or less, 2 times or less, 1.9 times or less, 1.8 times or less, 1.7 times or less, 1.6 times or less, 1.5 times or less, 1.4 times or less, 1.3 times or less, 1.2 times or less, 1.1 times or less, or 1.05 times or less the heat transmission coefficient before compression.

In some embodiments, when the aerogel composite is under application of a pressure of any one pressure value of 15 bar to 30 bar in the horizontal direction (transverse direction) with respect to the cross-section of the aerogel composite, the heat transmission coefficient after compression may be 2.3 times or less, 2.2 times or less, 2.1 times or less, 2 times or less, 1.9 times or less, 1.8 times or less, 1.7 times or less, 1.6 times or less, 1.5 times or less, 1.4 times or less, 1.3 times or less, 1.2 times or less, 1.1 times or less, or 1.05 times or less the heat transmission coefficient before compression.

In some embodiments, when the aerogel composite is under application of a pressure of any one pressure value of 24 bar to 33 bar in the horizontal direction (transverse direction) with respect to the cross-section of the aerogel composite, the heat transmission coefficient after compression may be 2.7 times or less, 2.6 times or less, 2.5 times or less, 2.4 times or less, 2.3 times or less, 2.2 times or less, 2.1 times or less, 2 times or less, 1.9 times or less, 1.8 times or less, 1.7 times or less, 1.6 times or less, 1.5 times or less, 1.4 times or less, 1.3 times or less, 1.2 times or less, or 1.1 times or less the heat transmission coefficient before compression.

In some embodiments, when the aerogel composite is under application of a pressure of any one pressure value of 24 bar to 30 bar in the horizontal direction (transverse direction) with respect to the cross-section of the aerogel composite, the heat transmission coefficient after compression may be 2.7 times or less, 2.6 times or less, 2.5 times or less, 2.4 times or less, 2.3 times or less, 2.2 times or less, 2.1 times or less, 2 times or less, 1.9 times or less, 1.8 times or less, 1.7 times or less, 1.6 times or less, 1.5 times or less, 1.4 times or less, 1.3 times or less, 1.2 times or less, or 1.1 times or less the heat transmission coefficient before compression.

In some embodiments, when the aerogel composite is under application of a pressure of any one pressure value of 30 bar to 33 bar in the horizontal direction (transverse direction) with respect to the cross-section of the aerogel composite, the heat transmission coefficient after compression may be 3 times or less, 2.9 times or less, 2.8 times or less, 2.7 times or less, 2.6 times or less, 2.5 times or less, 2.4 times or less, 2.3 times or less, 2.2 times or less, 2.1 times or less, 2 times or less, 1.9 times or less, 1.8 times or less, 1.7 times or less, 1.6 times or less, 1.5 times or less, 1.4 times or less, 1.3 times or less, 1.2 times or less, or 1.1 times or less the heat transmission coefficient before compression.

In some embodiments, when the aerogel composite is under application of a pressure of 3 bar in the horizontal direction (transverse direction) with respect to the cross-section of the aerogel composite, the heat transmission coefficient after compression may be 1.8 times or less, 1.24 times or less, 1.2 times or less, 1.15 times or less, 1.1 times or less, 1.05 times or less, 1.04 times or less, 1.03 times or less, 1.02 times or less, or 1.01 times or less, preferably 1.2 times or less, 1.1 times or less, 1.05 times or less, 1.04 times or less, 1.03 times or less, 1.02 times or less, or 1.01 times or less the heat transmission coefficient before compression.

In some embodiments, when the aerogel composite is under application of a pressure of 9 bar in the horizontal direction (transverse direction) with respect to the cross-section of the aerogel composite, the heat transmission coefficient after compression may be 1.8 times or less, 1.7 times or less, 1.6 times or less, 1.5 times or less, 1.4 times or less, 1.3 times or less, 1.2 times or less, 1.1 times or less, 1.05 times or less, 1.04 times or less, 1.03 times or less, 1.02 times or less, or 1.01 times or less, preferably 1.5 times or less, 1.4 times or less, 1.3 times or less, 1.2 times or less, 1.1 times or less, 1.05 times or less, 1.04 times or less, 1.03 times or less, 1.02 times or less, or 1.01 times or less the heat transmission coefficient before compression.

In some embodiments, when the aerogel composite is under application of a pressure of 15 bar in the horizontal direction (transverse direction) with respect to the cross-section of the aerogel composite, the heat transmission coefficient after compression may be 2.35 times or less, 2.3 times or less, 2.2 times or less, 2.1 times or less, 2 times or less, 1.9 times or less, 1.8 times or less, 1.7 times or less, 1.6 times or less, 1.5 times or less, 1.4 times or less, 1.3 times or less, 1.2 times or less, 1.1 times or less, 1.05 times or less, 1.04 times or less, 1.03 times or less, 1.02 times or less, or 1.01 times or less, preferably 2 times or less, 1.9 times or less, 1.8 times or less, 1.7 times or less, 1.6 times or less, 1.5 times or less, 1.4 times or less, 1.3 times or less, 1.2 times or less, 1.1 times or less, or 1.05 times or less, more preferably 1.7 times or less, 1.6 times or less, 1.5 times or less, 1.4 times or less, 1.3 times or less, 1.2 times or less, or 1.1 times or less the heat transmission coefficient before compression.

In some embodiments, when the aerogel composite is under application of a pressure of 24 bar in the horizontal direction (transverse direction) with respect to the cross-section of the aerogel composite, the heat transmission coefficient after compression may be 2.7 times or less, 2.6 times or less, 2.5 times or less, 2.4 times or less, 2.3 times or less, 2.2 times or less, 2.1 times or less, 2 times or less, 1.9 times or less, 1.8 times or less, 1.7 times or less, 1.6 times or less, 1.5 times or less, 1.4 times or less, 1.3 times or less, 1.2 times or less, 1.1 times or less, 1.05 times or less, 1.04 times or less, 1.03 times or less, 1.02 times or less, or 1.01 times or less, preferably 2 times or less, 1.9 times or less, 1.8 times or less, 1.7 times or less, 1.6 times or less, 1.5 times or less, 1.4 times or less, 1.3 times or less, 1.2 times or less, 1.1 times or less, or 1.05 times or less, more preferably 1.7 times or less, 1.6 times or less, 1.5 times or less, 1.4 times or less, 1.3 times or less, 1.2 times or less, or 1.1 times or less the heat transmission coefficient before compression.

In some embodiments, when the aerogel composite is under application of a pressure of 30 bar in the horizontal direction (transverse direction) with respect to the cross-section of the aerogel composite, the heat transmission coefficient after compression may be 3 times or less, 2.9 times or less, 2.8 times or less, 2.7 times or less, 2.6 times or less, 2.5 times or less, 2.4 times or less, 2.3 times or less, 2.2 times or less, 2.1 times or less, 2 times or less, 1.9 times or less, 1.8 times or less, 1.7 times or less, 1.6 times or less, 1.5 times or less, 1.4 times or less, 1.3 times or less, 1.2 times or less, 1.1 times or less, 1.05 times or less, 1.04 times or less, 1.03 times or less, 1.02 times or less, or 1.01 times or less, preferably 2.3 times or less, 2.2 times or less, 2.1 times or less, 2 times or less, 1.9 times or less, 1.8 times or less, 1.7 times or less, 1.6 times or less, 1.5 times or less, 1.4 times or less, 1.3 times or less, 1.2 times or less, 1.1 times or less, or 1.05 times or less, more preferably 1.7 times or less, 1.6 times or less, 1.5 times or less, 1.4 times or less, 1.3 times or less, 1.2 times or less, or 1.1 times or less the heat transmission coefficient before compression.

In some embodiments, when the aerogel composite is under application of a pressure of 33 bar in the horizontal direction (transverse direction) with respect to the cross-section of the aerogel composite, the heat transmission coefficient after compression may be 3 times or less, 2.9 times or less, 2.8 times or less, 2.7 times or less, 2.6 times or less, 2.5 times or less, 2.4 times or less, 2.3 times or less, 2.2 times or less, 2.1 times or less, 2 times or less, 1.9 times or less, 1.8 times or less, 1.7 times or less, 1.6 times or less, 1.5 times or less, 1.4 times or less, 1.3 times or less, 1.2 times or less, 1.1 times or less, 1.05 times or less, 1.04 times or less, 1.03 times or less, 1.02 times or less, or 1.01 times or less, preferably 2.3 times or less, 2.2 times or less, 2.1 times or less, 2 times or less, 1.9 times or less, 1.8 times or less, 1.7 times or less, 1.6 times or less, 1.5 times or less, 1.4 times or less, 1.3 times or less, 1.2 times or less, or 1.1 times or less, more preferably 2.0 times or less, 1.9 times or less, 1.8 times or less, 1.7 times or less, 1.6 times or less, 1.5 times or less, 1.4 times or less, 1.3 times or less, or 1.2 times or less the heat transmission coefficient before compression.

In some embodiments, when the aerogel composite is under application of a pressure of each of 3 bar, 9 bar, and 24 bar in the horizontal direction (transverse direction) with respect to the cross-section of the aerogel composite, the heat transmission coefficient after compression may be 1.8 times or less, or 1.7 times or less, preferably greater than 1 time, 1.8 times or less, or greater than 1 time to 1.7 times or less the heat transmission coefficient before compression. In some embodiments, the heat transmission coefficient after compression may be 1.8 times or less the heat transmission coefficient before compression. In some embodiments, the heat transmission coefficient after compression may be greater than 1 time to equal to or less than 1.8 times the heat transmission coefficient before compression.

Even when the aerogel composite provided in the present disclosure is pressurized (or compressed) with a pressure of any intensity, the heat transmission coefficient before and after compression is maintained within a specific range, so that the thermal insulation performance may be maintained at an excellent level without significant degradation.

Specifically, the heat transmission coefficient obtained after compressing the aerogel composite of the present disclosure with a pressure of at least one pressure value of 0 bar to 24 bar may satisfy Equation 4 below:

$$\{(\text{Heat transmission coefficient } (a) \text{ before and after compression} - \text{Average value } (b) \text{ of heat transmission coefficients before and after compression})\} = (\text{Average value } (b) \text{ of heat transmission coefficients before and after compression}) \times A \quad [\text{Equation 4}]$$

In Equation 4 above, the heat transmission coefficient (a) before and after compression indicates the heat transmission coefficient obtained after compression with a pressure of at least one pressure value in the range of 0 bar to 24 bar in the horizontal direction (transverse direction) with respect to the cross-section of the aerogel composite. In some embodiments, the heat transmission coefficient (a) before and after compression may indicate the heat transmission coefficient obtained after compressing the aerogel composite with a pressure of 0 bar, 3 bar, 9 bar, or 24 bar. Here, the pressure of 0 bar indicates no application of pressure (no compression), and accordingly, the heat transmission coefficient obtained after compression under application of a pressure of 0 bar indicates the heat transmission coefficient of the aerogel composite that is not pressurized.

In addition, the "average value (b) of heat transmission coefficients before and after compression" indicates the average value of heat transmission coefficients of the aerogel composite under no application of pressure (or compression), and heat transmission coefficients obtained after compression with a pressure value of at least two pressure values in the range greater than 0 bar to 24 bar or less in the horizontal direction (transverse direction) with respect to the cross-section of the aerogel composite. In some embodiments, it may indicate the average value of heat transmission coefficients of the aerogel composite under no application of pressure (or compression), and heat transmission coefficients obtained by compressing the aerogel composite with at least two pressure values of 3 bar, 9 bar, or 24 bar.

The A may be a rational number of from −0.40 to +0.40, a rational number of from −0.35 to +0.35, a rational number of from −0.34 to +0.34, a rational number of from −0.33 to +0.33, a rational number of from −0.32 to +0.32, a rational number of from −0.31 to +0.31, a rational number of from −0.30 to +0.30, a rational number of from −0.25 to +0.25, a rational number of from −0.24 to +0.24, a rational number of from −0.23 to +0.23, a rational number of from −0.22 to +0.22, a rational number of from −0.21 to +0.21, a rational number of from −0.20 to +0.20, a rational number of from −0.19 to +0.19, a rational number of from −0.15 to +0.15, a rational number of from −0.14 to +0.14, a rational number of from −0.13 to +0.13, a rational number of from −0.12 to +0.12, or a rational number of from −0.11 to +0.11.

In some embodiments, the heat transmission coefficient of the aerogel composite with no compression (0 bar compression) may satisfy Equation 4 above. In this case, the average value (b) of heat transmission coefficients before and after compression may indicate the average value of heat transmission coefficients of the aerogel composite with no compression, and heat transmission coefficients obtained after compression with a pressure of at least two pressure values of 3 bar, 9 bar, or 24 bar in the horizontal direction (transverse direction) with respect to the cross-section of the aerogel composite.

In some embodiments, the heat transmission coefficient obtained after compressing the aerogel composite with a pressure of 3 bar, 9 bar, or 24 bar may satisfy Equation 4 above. In this case, the average value (b) of heat transmission coefficients before and after compression may indicate the average value of heat transmission coefficients of the aerogel composite with no compression (0 bar compression), and heat transmission coefficients obtained after compression with a pressure of at least two pressure values of 3 bar, 9 bar, or 24 bar in the horizontal direction (transverse direction) with respect to the cross-section of the aerogel composite.

In some embodiments, the heat transmission coefficient of the aerogel composite with no compression (0 bar compression) may satisfy Equation 4 above. In this case, the average value (b) of heat transmission coefficients before and after compression may indicate the average value of heat transmission coefficients of the aerogel composite with no compression, and heat transmission coefficients obtained after compression with a pressure value of each of 3 bar, 9 bar, and 24 bar in the horizontal direction (transverse direction) with respect to the cross-section of the aerogel composite.

In some embodiments, the heat transmission coefficient obtained after compressing the aerogel composite with a pressure of 3 bar, 9 bar, or 24 bar may satisfy Equation 4 above. In this case, the average value (b) of heat transmission coefficients before and after compression may indicate the average value of heat transmission coefficients of the aerogel composite with no compression (0 bar compression), and heat transmission coefficients obtained after compression with a pressure value of each of 3 bar, 9 bar, and 24 bar in the horizontal direction (transverse direction) with respect to the cross-section of the aerogel composite.

In some embodiments, the heat transmission coefficient of the aerogel composite with no compression (0 bar compression) may satisfy Equation 4 above. In this case, the average value (b) of heat transmission coefficients before and after compression may indicate the average value of heat transmission coefficients of the aerogel composite with no compression, and heat transmission coefficients obtained after compression with a pressure value of each of 3 bar and 9 bar in the horizontal direction (transverse direction) with respect to the cross-section of the aerogel composite.

In some embodiments, the heat transmission coefficient obtained after compressing the aerogel composite with a pressure of 3 bar or 9 bar may satisfy Equation 4 above. In this case, the average value (b) of heat transmission coefficients before and after compression may indicate the average value of heat transmission coefficients of the aerogel composite with no compression (0 bar compression), and heat transmission coefficients obtained after compression with a pressure value of each of 3 bar and 9 bar in the horizontal direction (transverse direction) with respect to the cross-section of the aerogel composite.

In some embodiments, the average value (b) of the heat transmission coefficients before and after compression may indicate the average value of heat transmission coefficients of the aerogel composite with no compression (0 bar compression), and heat transmission coefficients obtained after compression with a pressure of each of 3 bar, 9 bar, and 24 bar in the horizontal direction (transverse direction) with respect to the cross-section of the aerogel composite, and in this case, the A may be a rational number of from −0.40 to +0.40, a rational number of from −0.35 to +0.35, a rational number of from −0.30 to +0.30, or a rational number of from −0.25 to +0.25.

In some embodiments, the average value (b) of the heat transmission coefficients before and after compression may indicate the average value of heat transmission coefficients of the aerogel composite with no compression (0 bar compression), and heat transmission coefficients obtained after compression with a pressure of each of 3 bar and 9 bar in the horizontal direction (transverse direction) with respect to the cross-section of the aerogel composite, and in this case, the A may be a rational number of from −0.23 to +0.23, a rational number of from −0.22 to +0.22, a rational number of from −0.21 to +0.21, or a rational number of from −0.20 to +0.20.

In some embodiments, the heat transmission coefficient obtained after compressing the aerogel composite with a pressure of 0 bar, 3 bar, 9 bar, or 24 bar may satisfy Equation 4 above. In this case, the average value (b) of heat transmission coefficients before and after compression may indicate the average value of heat transmission coefficients of the aerogel composite with no compression (0 bar compression), and heat transmission coefficients obtained after compression with a pressure value of each of 3 bar, 9 bar, and 24 bar in the horizontal direction (transverse direction) with respect to the cross-section of the aerogel composite. In this case, the A may be a rational number of from −0.40 to +0.40.

In some embodiments, the heat transmission coefficient obtained after compressing the aerogel composite with a pressure of 3 bar, 9 bar, or 24 bar may satisfy Equation 4 above. In this case, the average value (b) of heat transmission coefficients after compression may indicate the average value of heat transmission coefficients obtained after compression with a pressure value of each of 3 bar and 9 bar in the horizontal direction (transverse direction) with respect to the cross-section of the aerogel composite. In this case, the A may be a rational number of from −0.23 to +0.23.

In addition, even when the aerogel composite provided in the present disclosure is pressurized (or compressed) with a pressure of any intensity, the heat transmission coefficient after the compression is maintained within a specific range, so that the thermal insulation performance may be maintained at an excellent level without significant degradation.

Specifically, the heat transmission coefficient obtained after compressing the aerogel composite of the present disclosure with a pressure of at least one pressure value of 3 bar to 30 bar may satisfy Equation 5 below:

(Heat transmission coefficient (c) after compression–
  Average value (d) of heat transmission coefficients after compression)=(Average value (d) of heat transmission coefficients after compression)×B  [Equation 5]

In Equation 5 above, the heat transmission coefficient (c) after compression indicates the heat transmission coefficient obtained after compression with at least one pressure value in the range of 3 bar to 30 bar in the horizontal direction (transverse direction) with respect to the cross-section of the aerogel composite. In some embodiments, the heat transmission coefficient (c) after compression may indicate the heat transmission coefficient obtained after compression with a pressure of 3 bar, 9 bar, 15 bar, 24 bar, or 30 bar, and as another example, may indicate the heat transmission coefficient obtained after compression with a pressure of 3 bar, 9 bar, or 24 bar.

In addition, the average value (d) of heat transmission coefficients after compression indicates the average value of heat transmission coefficients obtained after compression with at least two pressure values in the range of 3 bar to 30 bar in the horizontal direction (transverse direction) with respect to the cross-section of the aerogel composite. In some embodiments, the average value (d) of heat transmission coefficients after compression may indicate the average value of heat transmission coefficients obtained after compression with a pressure of each of 3 bar, 9 bar, and 24 bar.

The B may be a rational number of from −0.30 to +0.30, a rational number of from −0.29 to +0.29, a rational number of from −0.28 to +0.28, a rational number of from −0.27 to +0.27, a rational number of from −0.26 to +0.26, a rational number of from −0.25 to +0.25, a rational number of from −0.24 to +0.24, a rational number of from −0.23 to +0.23, a rational number of from −0.22 to +0.22, a rational number of from −0.21 to +0.21, a rational number of from −0.20 to +0.20, a rational number of from −0.19 to +0.19, a rational number of from −0.15 to +0.15, a rational number of from −0.14 to +0.14, a rational number of from −0.13 to +0.13, a rational number of from −0.12 to +0.12, a rational number of from −0.11 to +0.11, or a rational number of from −0.10 to +0.10.

In some embodiments, the heat transmission coefficient obtained after compressing the aerogel composite of the present disclosure with a pressure of 3 bar, 9 bar, or 24 bar may satisfy Equation 5 above. In this case, in Equation 5 above, the heat transmission coefficient (c) after compression may indicate the heat transmission coefficient obtained after compression with a pressure value of 3 bar, 9 bar, or 24 bar in the horizontal direction (transverse direction) with respect to the cross-section of the aerogel composite, and the average value (d) of heat transmission coefficients after compression may indicate the average value of heat transmission coefficients obtained after compression with at least two pressure values of 3 bar, 9 bar, or 24 bar in the horizontal direction (transverse direction) with respect to the cross-section of the aerogel composite.

In some embodiments, the heat transmission coefficient obtained after compressing the aerogel composite of the present disclosure with a pressure of 3 bar, 9 bar, or 24 bar may satisfy Equation 5 above. In this case, in Equation 5 above, the heat transmission coefficient (c) after compression indicates the heat transmission coefficient obtained after compression with a pressure value of 3 bar, 9 bar, or 24 bar in the horizontal direction (transverse direction) with respect to the cross-section of the aerogel composite, the average value (d) of heat transmission coefficients after compression indicates the average value of heat transmission coefficients obtained after compression with a pressure value of each of 3 bar, 9 bar, and 24 bar in the horizontal direction (transverse direction) with respect to the cross-section of the aerogel composite, and the B may be a rational number of from −0.30 to +0.30, a rational number of from −0.29 to +0.29, a rational number of from −0.28 to +0.28, a rational number of from −0.27 to +0.27, a rational number of from −0.26 to +0.26, a rational number of from −0.25 to +0.25, a rational number of from −0.24 to +0.24, or a rational number of from −0.23 to +0.23.

In some embodiments, the heat transmission coefficient obtained after compressing the aerogel composite of the present disclosure with a pressure of 3 bar, 9 bar, and 24 bar may satisfy Equation 5 above. In this case, in Equation 5 above, the heat transmission coefficient (c) after compression indicates the heat transmission coefficient obtained after compression with any one pressure value among 3 bar, 9 bar, and 24 bar in the horizontal direction (transverse direction) with respect to the cross-section of the aerogel composite, the average value (d) of heat transmission coefficients after compression indicates the average value of heat transmission coefficients obtained after compression with a pressure value of each of 3 bar, 9 bar, and 24 bar in the horizontal direction (transverse direction) with respect to the cross-section of the aerogel composite, and the B may be a rational number of from −0.30 to +0.30, a rational number of from −0.29 to +0.29, a rational number of from −0.28 to +0.28, a rational number of from −0.27 to +0.27, a rational number of from −0.26 to +0.26, a rational number of from −0.25 to +0.25, a rational number of from −0.24 to +0.24, or a rational number of from −0.23 to +0.23. In some embodiments, the B may be a rational number of from −0.30 to +0.30.

In addition, with respect to the aerogel composite, a change rate (C) of heat transmission coefficient after compression per unit application pressure represented by Equation 6 below may be a rational number of −0.15 or greater, −0.14 or greater, −0.13 or greater, −0.12 or greater, −0.11 or greater, −0.10 or greater, −0.09 or greater, −0.08 or greater, −0.07 or greater, −0.06 or greater, −0.05 or greater, −0.04 or greater, −0.03 or greater, −0.02 or greater, or −0.01 or greater, and a rational number of +0.15 or less, +0.14 or less, +0.13 or less, +0.12 or less, +0.11 or less, +0.10 or less, +0.09 or less, +0.08 or less, +0.07 or less, +0.06 or less, +0.05 or less, +0.04 or less, +0.03 or less, +0.02 or less, or +0.01 or less. Preferably, the change rate (C) may be a rational number of from −0.15 to +0.15, a rational number of from −0.14 to +0.14, a rational number of from −0.13 to +0.13, a rational number of from −0.12 to +0.12, a rational number of from −0.11 to +0.11, or a rational number of from −0.10 to +0.10. In some embodiments, the change rate (C) may be a rational number of from −0.15 to +0.15.

$$C = \text{(heat transmission coefficient after compression with a pressure of } x \text{ − heat transmission coefficient after compression with a pressure of } y\text{)} / (x-y)$$ [Equation 6]

In Equation 6 above, x and y are independently any one pressure value (unit bar) in the pressure range of 3 bar to 24 bar, and are different pressure values from each other.

In some embodiments, in Equation 6 above, x and y may independently be any one pressure value among 3 bar, 9 bar, 15 bar, and 24 bar.

In some embodiments, in Equation 6 above, x may be 24 bar, and y may be 3 bar.

In some embodiments, in Equation 6 above, x may be 24 bar, and y may be 9 bar.

In some embodiments, in Equation 6 above, x may be 15 bar, and y may be 9 bar.

In some embodiments, in Equation 6 above, x may be 24 bar, and y may be 15 bar.

In some embodiments, in Equation 6 above,

In the present disclosure, when measuring the recovery rate or heat transmission coefficient after compression using a press device as described above, a single specimen may be prepared from the aerogel composite and measured, but depending on the measuring instrument, when the horizontal or vertical size of the aerogel composite is smaller than the pressure-applying portion of the measuring instrument, the aerogel composite is cut into two or more pieces, rearranged so that both the horizontal and vertical sizes thereof are larger than the pressure-applying instrument, and then the compression recovery rate or heat transmission coefficient is measured, and still the measured values are considered to be substantially the same as that of the single specimen.

In some embodiments, the recovery rate after compression or the heat transmission coefficient after compression may be measured on a rectangular aerogel composite specimen having a size of 30 cm×24 cm in width and length. In this case, when the horizontal or vertical length of the prepared aerogel composite is smaller than 30 cm or 24 cm, respectively, two or more specimens may be placed to be in parallel and rearranged to have a size of 30 cm×24 cm, and then measured.

In the present disclosure, the aerogel composite has a compressive strength of 20 kPa to 80 kPa, 20 kPa to 70 kPa, 30 kPa to 80 kPa, 30 kPa to 70 kPa, 35 kPa to 80 kPa, or 35 kPa to 70 kPa at 10% deformation, and may have excellent mechanical strength. Here, the compressive strength may be measured by preparing a specimen according to the ASTM C165 standard.

In the present disclosure, the aerogel composite has a tensile strength of 30 N/cm$^2$ to 60 N/cm$^2$, 40 N/cm$^2$ to 55 N/cm$^2$, or 45 N/cm$^2$ to 55 N/cm$^2$, and may have excellent flexibility. Here, the tensile strength may be measured by preparing a specimen according to the ASTM D638 standard.

In the present disclosure, the aerogel composite may be generally formed by preparing a silica sol, impregnating a fiber substrate with the silica sol, and then performing gelation thereon, and drying the same. Hereinafter, each step will be described. However, the specific preparation processes or examples thereof described herein are not intended to be limited to any particular type of aerogel or preparation method thereof. The present disclosure may include any aerogel formed through any associated preparation method known to those skilled in the art.

Preparation of Silica Sol;

In the present disclosure, a silica precursor composition and a catalyst composition may be mixed to prepare a silica sol.

In the present disclosure, the silica precursor composition may include water and/or a polar organic solvent in a silica precursor.

In the present disclosure, the silica precursor may be used without limitation as long as it is a precursor which may be used to form a silica aerogel, and for example, may be a silicon-containing alkoxide-based compound. Specifically, the silica precursor may be a tetraalkyl silicate, such as tetramethyl orthosilicate (TMOS), tetraethyl orthosilicate (TEOS), methyl triethyl orthosilicate, dimethyl diethyl orthosilicate, tetrapropyl orthosilicate, tetraisopropyl orthosilicate, tetrabutyl orthosilicate, tetra secondary butyl orthosilicate, tetra tertiary butyl orthosilicate, tetrahexyl orthosilicate, tetracyclohexyl orthosilicate, and tetradodecyl orthosilicate. Among these, more specifically, in the case of the present disclosure, the silica precursor may be tetramethyl orthosilicate (TMOS), tetraethyl orthosilicate (TEOS), or a mixture thereof.

In addition, in the present disclosure, the silica precursor may be a water glass solution. Here, the water glass solution may be a diluted solution in which distilled water is added to water glass and then mixed therewith, and the water glass may be sodium silicate ($Na_2SiO_3$) which is an alkali silicate salt obtained by melting silicon dioxide ($SiO_2$) and alkali.

In addition, in the present disclosure, the silica precursor may include a pre-hydrolyzed TEOS (HTEOS). The HTEOS is an ethyl silicate oligomer material having a wide molecular weight distribution, and when synthesized into an oligomer form from a TEOS monomer, physical properties such as gelation time may be adjusted, and thus, the HTEOS may be easily applied according to a user's reaction conditions. In addition, there is a benefit in that reproducible physical properties of a final product may be created. The HTEOS may typically be synthesized by a condensation reaction of TEOS which has undergone a partial hydration step under acidic conditions. That is, the HTEOS is in the form of an oligomer prepared by condensing TEOS, wherein the oligomer is partially hydrated.

In the present disclosure, the silica precursor composition may further include silicate including a hydrophobic group. In the present disclosure, the type of the silicate including a hydrophobic group is not limited as long as it is an alkyl silane compound including an alkyl group inducing hydrophobization and a silane functional group capable of reacting with an —Si—O-functional group of a wet gel, but specific examples thereof may include one or more selected from the group consisting of methyltriethoxysilane (MTES), trimethylethoxysilane (TMES), trimethylsilanol (TMS), methyltrimethoxysilane (MTMS), dimethyldiethoxysilane (DMDEOS), ethyltriethoxysilane (ETES), and phenyltriethoxysilane (PTES), but are not limited thereto.

In the present disclosure, when the silicate including the hydrophobic group is included in the silica precursor composition, the silicate including the hydrophobic group and the tetraalkyl silicate may be included in a molar ratio (molar ratio of silicate including a hydrophobic group:tetraalkyl silicate) of 2:98 to 98:2. Within the above range, the strength and thermal insulation performance of an aerogel may be secured with high efficiency, and contraction may be prevented during atmospheric pressure drying, thereby preventing degradation in thermal insulation performance.

In the present disclosure, the silica precursor composition may have a silica concentration of 10 kg/m$^3$ to 100 kg/m$^3$, 20 kg/m$^3$ to 80 kg/m$^3$, 30 kg/m$^3$ to 70 kg/m$^3$, 30 kg/m$^3$ to 60 kg/m$^3$, or 35 kg/m$^3$ to 45 kg/m$^3$, but is not limited thereto. In the present disclosure, the silica concentration is the concentration of the silica included in the silica precursor with respect to the silica precursor composition, and may be suitably adjusted by varying the contents of a silica precursor, an organic solvent, and water.

In the present disclosure, the silica precursor may be used in an amount such that the content of the silica included in the silica sol becomes 0.1 wt % to 30 wt %, but is not limited thereto. When the content of the silica satisfies the above range, it is preferable in terms of securing mechanical physical properties, the flexibility in particular, of the aerogel composite at an excellent level while having the effect of improving thermal insulation.

In the present disclosure, the polar organic solvent may include an alcohol, and specific examples thereof may include a monohydric alcohol such as methanol, ethanol, isopropanol, and butanol, a polyhydric alcohol such as glycerol, ethylene glycol, propylene glycol, diethylene glycol, dipropylene glycol, and sorbitol, or a combination thereof, but other solvents as known to those skilled in the art may also be used without limitation. In the present disclosure, when considering the miscibility with water and an aerogel, the polar organic solvent may be a monohydric alcohol having 1 to 6 carbon atoms such as methanol, ethanol, isopropanol, and butanol, and may be, for example, ethanol.

In the present disclosure, the polar organic solvent may be used in an appropriate amount by those skilled in the art in consideration of the degree of hydrophobicity in an aerogel composite to be finally produced while promoting a surface modification reaction.

To prepare a pre-hydrolyzed silica precursor in the preparation of the silica precursor composition described above in the present disclosure, the silica precursor and the organic solvent may be mixed at a weight ratio of 1:0.1 to 1.5, 1:0.5 to 1.5, or 1:0.5 to 1.2, but are not limited thereto.

In addition, to prepare a pre-hydrolyzed silica precursor in the preparation of the silica precursor composition described above in the present disclosure, the silica precursor and water may be mixed at a molar ratio of 1:0.5 to 10, 1:1 to 8, or 1:3 to 6, but are not limited thereto.

In addition, when a pre-hydrolyzed silica precursor (e.g., pre-hydrolyzed TEOS) is included as a silica precursor in the preparation of the silica precursor composition described above in the present disclosure, in order to satisfy the silica concentration, the pre-hydrolyzed silica precursor (e.g., pre-hydrolyzed TEOS) and the organic solvent may be mixed at a weight ratio of 1:2 to 10, 1:3 to 8, or 1:3 to 6, but are not limited thereto.

In the present disclosure, the silica precursor composition may further include an acid catalyst, and specifically, may further include an acid catalyst when applying an alkoxy silane-based compound, which is not a hydrolysate, as a precursor. In this case, the acid catalyst may be used without limitation as long as it is an acid catalyst which allows the pH to be 3 or less, particularly the pH to be about 3. In some embodiments, a hydrochloric acid, a nitric acid, a sulfuric acid, a phosphoric acid, an oxalic acid, or an acetic acid may be used. In this case, the acid catalyst may be added in an amount which allows the pH of the sol to be 3 or less, and may be added in the form of an aqueous solution in which the acid catalyst is dissolved in an aqueous solvent.

In the present disclosure, the catalyst composition may include, as a base catalyst, an inorganic base such as sodium hydroxide or potassium hydroxide, or an organic base such as ammonium hydroxide. Specific examples thereof may include sodium hydroxide (NaOH), potassium hydroxide (KOH), calcium hydroxide (Ca(OH)$_2$), ammonia (NH3), ammonium hydroxide (NH$_4$OH; ammonia solution), tetramethylammonium hydroxide (TMAH), tetraethylammonium hydroxide (TEAH), tetrapropylammonium hydroxide (TPAH), tetrabutylammonium hydroxide (TBAH), methylamine, ethylamine, isopropylamine, monoisopropylamine, diethylamine, diisopropylamine, dibutylamine, trimethylamine, triethylamine, triisopropylamine, tributylamine, choline, monoethanolamine, diethanolamine, 2-aminoethanol, 2-(ethyl amino)ethanol, 2-(methyl amino)ethanol, N-methyl diethanolamine, dimethylaminoethanol, diethylaminoethanol, nitrilotriethanol, 2-(2-aminoethoxy)ethanol, 1-amino-2-propanol, triethanolamine, monopropanolamine, dibutanolamine, pyridine, a combination thereof, or the like, but are not limited thereto.

In the present disclosure, the base catalyst may be included in an amount which allows the pH of the sol to be 5 to 9. When the pH of the sol is out of the above range, gelation may not be easily achieved or a gelation rate may be too low, so that processability may be degraded. In addition, since the base may be precipitated when introduced in a solid phase, it may be preferable that the base is added in a solution phase diluted by an aqueous solvent or the organic solvent described above. In this case, the dilution ratio of the base catalyst and the organic solvent, specifically an alcohol, may be 1:4 to 1:100 with respect to the volume, but is not limited thereto.

In the present disclosure, since the catalyst composition further includes an alkoxy silane-based compound having a hydrophobic group, the hydrophobic agent and the silica wet gel may react to strengthen the structure and perform surface modification.

In the present disclosure, the type of the alkoxy silane-based compound having a hydrophobic group is not limited as long as it is an alkyl silane compound including an alkyl group inducing hydrophobization and a silane functional group capable of reacting with an —Si—O-functional group of a wet gel, but specific examples thereof may include one or more selected from the group consisting of trimethylethoxysilane (TMES), trimethylsilanol (TMS), trimethylchlorosilane (TMCS), methyltrimethoxysilane (MTMS), methyltriethoxysilane (MTES), dimethyldiethoxysilane (DMDEOS), ethyltriethoxysilane, and phenyltriethoxysilane, but are not limited thereto.

In the present disclosure, the alkoxy silane-based compound having a hydrophobic group may be included in an amount of 3 parts by weight to 15 parts by weight, 5 parts by weight to 10 parts by weight, or 6 parts by weight to 8 parts by weight, with respect to 100 parts by weight of the silica sol, but is not limited thereto.

However, in the present disclosure, when the catalyst composition includes an alkoxy silane-based compound having a hydrophobic group, water may be included to promote a surface modification reaction. In the present disclosure, the catalyst composition of the present disclosure may include 3 equivalents to 8 equivalents, 4 equivalents to 8 equivalents, or 5 equivalents to 6 equivalents of water with respect to 1 equivalent of a hydrophobizing agent.

In the present disclosure, in order to prepare the silica sol, the silica precursor composition and the catalyst composition may be mixed at a volume ratio of 1:0.01 to 10.0, 1:0.01 to 5.0, or 1:0.01 to 2.0, but are not limited thereto.

In the present disclosure, if necessary, an additive may be further added to the silica sol. In this case, all known additives which may be added when preparing an aerogel may be applied as the additive, and for example, an additive such as an opacifying agent and a flame retardant may be used.

In the present disclosure, the additive may be added in an amount of 0.1 wt % to 10 wt %, 0.1 wt % to 7 wt %, 0.5 wt % to 7 wt %, or 0.5 wt % to 5 wt % with respect to the silica content of the aerogel, but is not limited thereto.

Gelation of Silica Sol

In the present disclosure, after the silica sol is impregnated into the substrate, the silica sol may be subjected to gelation.

In the present disclosure, the impregnation process is a process of allowing a catalyzed silica sol to permeate into pores inside the substrate, and may be performed by introducing the catalyzed silica sol and the substrate into a reaction vessel, or may be performed by spraying the catalyzed silica sol on the substrate which is moving on a conveyor belt according to a roll-to-roll process. In this case, in order to improve the bonding between the substrate and the silica sol, the substrate may be lightly pressed down to be sufficiently impregnated. Thereafter, the substrate may be pressed to a predetermined thickness with a predetermined pressure to remove excess silica sol, so that drying time may be reduced.

In the present disclosure, the temperature of the silica sol in the reaction vessel may be 1° C. to 40° C., 20° C. to 40° C., 25° C. to 40° C., 30° C. to 40° C., or 35° C. to 45° C. When the temperature of the silica sol in the reaction vessel satisfies the above range, it is preferable in that the appropriate viscosity range of the catalyzed sol may be more easily achieved, and even the retention time is relatively short, a desired level of viscosity range may be achieved.

In the present disclosure, the catalyzed silica sol may be impregnated into the substrate at a volume ratio of 0.1 to 10:1 (catalyzed silica sol:substrate), a volume ratio of 0.1 to 1:1, a volume ratio of 0.3 to 1:1, a volume ratio of 0.5 to 1:1, or a volume ratio of 0.6 to 1:1, but is not limited thereto.

In the present disclosure, the silica sol impregnated into the substrate may be subjected to gelation simultaneously with the impregnation process of the silica sol or sequentially after the impregnation process.

In the present disclosure, the substrate impregnated with the catalyzed sol may be subjected to gelation on a moving element such as a conveyor belt.

In the present disclosure, the "gelation" may refer to a sol-gel reaction, and the "sol-gel reaction" may be forming a network structure from a silicon unit precursor material. Here, the network structure may be a planar mesh structure in which specific polygons having one or more types of atomic arrangement are linked to each other, or a structure in which specific polyhedrons share their vertices, edges, faces, and the like with each other to form a three-dimensional skeletal structure.

In the present disclosure, the gelation may be performed at an atmosphere temperature of 20° C. to 40° C., 20° C. to 30° C., 25° C. to 40° C., 30° C. to 40° C., or 35° C. to 40° C., and may preferably be performed at an atmosphere temperature of 30° C. to 40° C. or 35° C. to 40° C. to increase the strength of the skeletal structure of the aerogel.

In addition, in the present disclosure, the gelation time may be 1 minute to 120 minutes, 1 minute to 100 minutes, 1 minute to 60 minutes, 5 minutes to 60 minutes, 5 minutes to 40 minutes, 10 minutes to 40 minutes, 10 minutes to 30 minutes, or 10 minutes to 20 minutes, but is not limited thereto.

Aging of Wet Gel Composite, which has Gelled

In the present disclosure, if necessary, an aging step may be further included, which is leaving the wet gel composite obtained by gelation as described above to stand at an appropriate temperature so as to achieve a complete chemical change. In the aging step, the network structure formed by the gelation may be more firmly formed, so that the mechanical stability of the aerogel composite may be improved.

In the present disclosure, the aging step may be performed by leaving the wet gel composite, which has gelled to stand as it is at an appropriate temperature, or may be performed by adding a cross-linking-promoting compound.

In addition, in the present disclosure, the aging step may be performed by adding a solution in which a base catalyst such as sodium hydroxide (NaOH), potassium hydroxide (KOH), ammonium hydroxide ($NH_4OH$), triethylamine, and pyridine is diluted to a concentration of 1% to 10% in an organic solvent, in the presence of the wet gel composite. In this case, a Si—O—Si bonding in an aerogel is induced to the maximum to allow the network structure of a silica gel to be firmer, so that there is an effect of facilitating the maintenance of the pore structure in a drying process to be performed later. In this case, the organic solvent may be the alcohol described above, and specifically, may include ethanol.

In the present disclosure, the aging step may be performed by leaving the wet gel composite, which has gelled, to stand at a temperature of 30° C. to 80° C., 40° C. to 80° C., or 50° C. to 80° C. for 0.1 hours to 20 hours, 0.5 hours to 15 hours, 0.5 hours to 10 hours, 0.5 hours to 7 hours, or 1 hour to 5 hours to strengthen the pore structure, and within this range, it is possible to prevent an increase in production costs by preventing a loss of the solvent due to evaporation while preventing a decrease in productivity.

In addition, in the present disclosure, the aging step may be performed by performing primary aging of leaving the wet gel composite, which has gelled, at 30° C. to 80° C. for 0.1 hours to 5 hours to strengthen the pore structure, and then performing secondary aging at 30° C. to 80° C. for 0.1 hours to 20 hours, 0.5 hours to 15 hours, 0.5 hours to 10 hours, 0.5 hours to 7 hours, or 1 hour to 5 hours, in the presence of a solution in which the base catalyst is diluted to a concentration of 1% to 10% in an organic solvent.

In addition, in the present disclosure, in the aging step (secondary aging if performed in two stages), a mixed solution of an alkoxy silane-based compound and an alcohol may be added to provide an additional sol precursor source as well as unreacted sol to induce additional gelation in the silica gel network structure, thereby further strengthening the gel structure. In this case, the alkoxy silane-based compound may be included in an amount of 0.5 parts by weight to 9.5 parts by weight, 1.0 part by weight to 9.5 parts by weight, or 1.5 parts by weight to 9.5 parts by weight with respect to a total of 100 parts by weight of the aging solution.

In the present disclosure, the alkoxy silane-based compound may include one or more selected from the group consisting of tetramethyl orthosilicate (TMOS), tetraethyl orthosilicate (TEOS), methyl triethyl orthosilicate, dimethyl diethyl orthosilicate, tetrapropyl orthosilicate, tetraisopropyl orthosilicate, tetrabutyl orthosilicate, tetra secondary butyl orthosilicate, tetra tertiary butyl orthosilicate, tetrahexyl orthosilicate, tetracyclohexyl orthosilicate, tetradodecyl orthosilicate, methyltrimethoxysilane (MTMS), methyltriethoxysilane (MTES), trimethylethoxysilane (TMES), trimethylsilanol (TMS), trimethylchlorosilane (TMCS), ethyltriethoxysilane (ETES), dimethyldiethoxysilane (DMDEOS), and phenyltriethoxysilane.

In addition, in the present disclosure, the alcohol may specifically be a monohydric alcohol such as methanol, ethanol, isopropanol, and butanol, or a polyhydric alcohol such as glycerol, ethylene glycol, propylene glycol, diethylene glycol, dipropylene glycol, and sorbitol, preferably a monohydric alcohol having 1 to 6 carbon atoms such as methanol, ethanol, isopropanol, and butanol, and may be, for example, ethanol, but is not limited thereto.

In the present disclosure, the aging step may be performed in a separate reaction vessel after recovering the wet gel composite, which has gelled or may be performed inside the reaction vessel in which the gelation step has been performed.

Surface Modification of Aged Wet Gel Composite

In the present disclosure, if necessary, a surface modification step of hydrophobizing the surface of the wet gel composite obtained by the gelation as described above or the surface of the aged wet gel composite may be further included in the presence of a surface modifier.

In the present disclosure, as the surface modifier, a compound which hydrophobizes the surface of a wet gel may be applied without limitation, which may be, for example, a silane-based compound, a siloxane-based compound, a silanol-based compound, a silazane-based compound, or a combination thereof. Specific examples thereof may be a silane-based compound such as trimethylchlorosilane (TMCS), dimethyldimethoxysilane, dimethyldiethoxysilane, methyltrimethoxysilane (MTMS), methyltriethoxysilane (MTES), trimethylethoxysilane (TMES), vinyltrimethoxysilane, ethyltriethoxysilane, phenyltriethoxysilane, phenyltrimethoxysilane, tetraethoxysilane, dimethyldichlorosilane, and 3-aminopropyltriethoxysilane, a siloxane-based compound such as polydimethyl siloxane, polydiethyl siloxane, and octamethyl cyclotetra siloxane, a silanol-based compound such as trimethylsilanol, triethylsilanol, triphenyl silanol, and t-butyldimethylsilanol, a silazane-based compound such as 1,2-diethyldisilazane, 1,1,2,2-tetramethyldisilazane, 1,1,3,3-tetramethyldisilazane, 1,1,1,2,2,2-hexamethyldisilazane (HMDS), 1,1,2,2-tetraethyldisilazane, and 1,2-diisopropyldisilazane, or a combination thereof, but are not limited thereto.

In the present disclosure, the surface modifier may be used in a solution phase diluted in an organic solvent. Here, the organic solvent may be an alcohol (an organic solvent), and in this case, the surface modifier may be diluted to 1 vol % to 15 vol % with respect to the total volume of the diluted solution.

In addition, in the present disclosure, the surface modifier may be added in an amount of 0.01 vol % to 90 vol % with respect to the wet gel composite for a sufficient surface modification effect, but is not limited thereto.

In the present disclosure, the surface modification step may be performed at a temperature of 50° C. to 90° C., or 50° C. to 80° C. for 1 hour to 24 hours, but is not limited thereto.

Drying Step

In the present disclosure, a drying step of drying the surface-modified wet gel composite to obtain an aerogel composite may be included.

In the present disclosure, the drying may be performed as a process of removing only the solvent while maintaining the pore structure of the aged gel, and may be performed, for example, by supercritical drying or atmospheric pressure drying.

In the present disclosure, the supercritical drying process is performed using supercritical carbon dioxide, and for example, may be performed by placing the aged wet gel composite in a supercritical drying reactor, filling the reactor with $CO_2$ in a liquid state, performing a solvent replacement process of replacing an alcohol solvent inside the wet gel with $CO_2$, followed by raising the temperature to a temperature of 40° C. to 70° C. at a predetermined temperature increase rate, for example, a rate of 0.1° C./min to 1° C./min, and then maintaining a pressure equal to or higher than the pressure at which carbon dioxide becomes supercritical, for example, a pressure of 100 bar to 150 bar, thereby maintaining the supercritical state of carbon dioxide for a predetermined period of time, specifically, 20 minutes to 1 hour. In general, carbon dioxide becomes supercritical at a temperature of 31° C., and a pressure of 73.8 bar. After the predetermined temperature and the predetermined pressure at which carbon dioxide becomes supercritical are maintained for 2 hours to 12 hours, more specifically, 2 hours to 6 hours, the pressure is gradually removed to complete the supercritical drying process, thereby producing an aerogel composite, but the present disclosure is not limited thereto.

In addition, in the present disclosure, the atmospheric pressure drying process may be performed according to a typical method such as hot air drying or IR drying at a temperature of 70° C. to 200° C. and at an atmospheric pressure (1±0.3 atm), but is not limited thereto.

In addition to the above process, the present disclosure includes acidification of a basic metal oxide precursor (e.g., sodium silicate) in water to prepare a hydrogel. A salt by-product may be removed from a silicic acid precursor by ion exchange and/or subsequent washing of the formed gel with water. Removing the water from pores of the gel may be performed through exchange with a polar organic solvent, such as ethanol, methanol, or acetone. Subsequently, the liquid phase in the gel is at least partially extracted using innovative processing and extraction techniques.

In addition to the above process, the present disclosure includes reducing damage capillary force at a solvent/pore interface by chemical transformation of a matrix material in a wet gel state through conversion of a surface hydroxyl group to hydrophobic trimethylsilylether, thereby enabling liquid phase extraction from a gel material at a temperature and a pressure below the critical point of the solvent.

In addition to the above process, in the present disclosure, a liquid (solvent) in the gel material is frozen at a lower temperature and a sublimation process is subsequently performed, so that the solvent may be removed from the gel material. Such removal or drying of the solvent from the gel material is understood to be within the scope of the present disclosure. Such removal largely preserves the gel structure, resulting in producing an aerogel with unique properties.

The aerogel composite provided in the present disclosure may be usefully used as a thermal insulation material, thermal insulation material, or non-combustible material for aircraft, ships, automobiles, electronic devices, and batteries, as well as for plant facilities for heat and cold insulation, such as piping or industrial furnaces of various industrial facilities.

According to another embodiment of the present disclosure, a thermal insulation member includes the aerogel composite provided in the present disclosure.

In the present disclosure, the thermal insulation member may include the aerogel composite as described above, and a support member positioned on at least one of an upper surface and a lower surface of the aerogel composite.

In the present disclosure, the support member may be, for example, a film-like support member, a sheet-like support member, a foil-like support member, a porous support member, and the like.

In the present disclosure, the film-like support member is formed by molding a polymer raw material into a thin film, and examples thereof may include an organic film of such as PET and polyimide, a glass film, and the like (including a metal-deposited film).

In the present disclosure, the sheet-like support member is formed by molding an organic, inorganic, or metallic fibrous raw material, and examples thereof may include paper, a non-woven fabric (including a glass mat), an organic fiber fabric, glass cloth, and the like.

In the present disclosure, the foil-like support member is formed by molding a metal raw material into a thin film, and examples thereof may include an aluminum foil, a copper foil, and the like.

In the present disclosure, the porous support member has a porous structure made of an organic, inorganic, or metal raw material, and examples thereof may include a porous organic material (e.g., polyurethane foam), a porous inorganic material (e.g., a zeolite sheet), a porous metal material (e.g., a porous metal sheet, a porous aluminum sheet), and the like.

In the present disclosure, the thickness of the support member is not particularly limited, and may be, for example, 0.1 m to 100 m, or 1 m to 50 m.

In the present disclosure, the thermal insulation member may also be applied to applications such as a thermal insulation material, thermal insulation material, or non-combustible material in the construction field, aviation field, automobile field, batteries, home appliances, semiconductor field, industrial facilities, and the like.

Hereinafter, the present disclosure will be described in detail with reference to the following Examples. However, the following Examples are illustrative of the present disclosure, and the contents of the present disclosure are not limited by the following Examples.

EXAMPLE

Example 1

Tetraethyl orthosilicate (TEOS) and water were mixed in a molar ratio of 1:6 and ethanol having a weight ratio of 1:1 with TEOS was added thereto to prepare a silica precursor solution. In order to promote hydrolysis of the silica precursor solution, an HCl aqueous solution was added such that the silica precursor solution had a pH of about 3, and stirred for 2 hours or more to prepare a hydrated TEOS solution. Ethanol having a weight ratio of 1:4 with the hydrated TEOS solution was added to prepare a silica sol. A base catalyst solution (5 wt % of NaOH aqueous solution) having a volume ratio of 99:1 with the silica sol was added to prepare a catalyzed sol. After filling 33.3 L of the catalyzed sol in an impregnation tank, a fiber (a glass fiber mat, 5 mm) as a substrate was passed therethrough to infiltrate the catalyzed sol into the fiber, wherein the catalyzed silica sol was impregnated into the fiber mat at a volume ratio of 0.6:1 (catalyzed silica sol:fiber). The fiber which passed through the impregnation tank to allow the catalyzed sol to infiltrate thereinto was gelled for 10 minutes while moving on a conveyor belt at a predetermined rate. In this case, the ambient atmosphere temperature at the top of the conveyor belt was maintained at 35° C. Thereafter, the wet gel composite which has gelled was added with 109 vol % of a solution as an aging solution, which was obtained by diluting 2.9 wt % of methyltriethoxysilane (MTES) in ethanol having a water content of 10 wt %, with respect to the volume of the wet gel composite to be aged at a temperature of 75° C. for 1 hour. The aged wet gel composite was added with 90 vol % of a hexamethyldisilazane (HMDS)/ethanol solution (volume ratio of 5:95) as a surface modifier with respect to the volume of the wet gel composite, and then was subjected to surface modification at a temperature of 75° C. for 4 hours. Thereafter, silica wet gel was placed in a 7.2 L supercritical extractor and $CO_2$ was injected thereto. Then, a process of raising the temperature in the extractor to 70° C. over 1 hour and 20 minutes, and injecting and venting $CO_2$ at a rate of 0.5 L/min for 20 minutes upon reaching 70° C. and 150 bar, and stopping the injection of $CO_2$ for 20 minutes and keeping the status was repeated 4 times. Ethanol was recovered through the bottom of a separator upon the injection and venting of $CO_2$. Thereafter, $CO_2$ was vented over 2 hours to prepare a hydrophobic silica aerogel composite.

Example 2

Tetraethyl orthosilicate (TEOS) and water were mixed in a molar ratio of 1:6 and ethanol having a weight ratio of 1:1 with TEOS was added thereto to prepare a silica precursor solution. In order to promote hydrolysis of the silica precursor solution, an HCl aqueous solution was added such that the silica precursor solution had a pH of about 3, and stirred for 2 hours or more to prepare a hydrated TEOS solution. Ethanol having a weight ratio of 1:3 with the hydrated TEOS solution was added to prepare a silica sol. A base catalyst solution (5 wt % of NaOH aqueous solution) having a volume ratio of 99:1 with the silica sol was added to prepare a catalyzed sol. After filling 33.3 L of the catalyzed sol in an impregnation tank, a fiber (a glass fiber mat, 5 mm) as a substrate was passed therethrough to infiltrate the catalyzed sol into the fiber, wherein the catalyzed silica sol was impregnated into the fiber mat at a volume ratio of 0.6:1 (catalyzed silica sol:fiber). The fiber which passed through the impregnation tank to allow the catalyzed sol to infiltrate thereinto was gelled for 10 minutes while moving on a conveyor belt at a predetermined rate. In this case, the ambient atmosphere temperature at the top of the conveyor belt was maintained at 35° C. Thereafter, the wet gel composite which has gelled was added with 109 vol % of a solution as an aging solution, which was obtained by diluting 2.9 wt % of methyltriethoxysilane (MTES) in ethanol having a water content of 10 wt %, with respect to the volume of the wet gel composite to be aged at a temperature of 75° C. for 1 hour. The aged wet gel composite was added with 90 vol % of a solution (2 vol %) as a surface modifier, which was obtained by diluting trimethylethoxysilane(TMES) in ethanol, with respect to the volume of the wet gel composite, and then was subjected to surface modification at a temperature of 75° C. for 12 hours. Thereafter, silica wet gel was placed in a 7.2 L supercritical extractor and $CO_2$ was injected thereto. Then, a process of raising the temperature in the extractor to 70° C. over 1 hour and 20 minutes, and injecting and venting $CO_2$ at a rate of 0.5 L/min for 20 minutes upon reaching 70° C. and 150 bar, and stopping the injection of $CO_2$ for 20 minutes and keeping the status was repeated 4 times. Ethanol was recovered through the bottom of a separator upon the injection and venting of $CO_2$. Thereafter, $CO_2$ was vented over 2 hours to prepare a hydrophobic silica aerogel composite.

Example 3

Tetraethyl orthosilicate (TEOS) and water were mixed in a molar ratio of 1:5 and ethanol having a weight ratio of 1:1 with TEOS was added thereto to prepare a silica precursor solution. In order to promote hydrolysis of the silica precursor solution, an HCl aqueous solution was added such that the silica precursor solution had a pH of about 3, and stirred for 2 hours or more to prepare a hydrated TEOS solution. Ethanol having a weight ratio of 1:5 with the hydrated TEOS solution was added to prepare a silica sol. A base catalyst solution (5 wt % of NaOH aqueous solution) having a volume ratio of 99:1 with the silica sol was added to prepare a catalyzed sol. After filling 33.3 L of the catalyzed sol in an impregnation tank, a fiber (a glass fiber mat, 10 mm) as a substrate was passed therethrough to infiltrate the catalyzed sol into the fiber, wherein the catalyzed silica sol was impregnated into the fiber mat at a volume ratio of 1:1 (catalyzed silica sol:fiber). The fiber which passed through the impregnation tank to allow the catalyzed sol to infiltrate thereinto was gelled for 10 minutes while moving on a conveyor belt at a predetermined rate. In this case, the ambient atmosphere temperature at the top of the conveyor belt was maintained at 40° C. Thereafter, the wet gel composite which has gelled was added with 109 vol % of a solution as an aging solution, which was obtained by diluting 2.9 wt % of methyltriethoxysilane (MTES) in ethanol having a water content of 10 wt %, with respect to the volume of the wet gel composite to be aged at a temperature of 75° C. for 1 hour. The aged wet gel composite was added with 90 vol % of a hexamethyldisilazane (HMDS)/ethanol solution (volume ratio of 5:95) as a surface modifier with respect to the volume of the wet gel composite, and then was subjected to surface modification at a temperature of 75° C. for 4 hours. Thereafter, silica wet gel was placed in a 7.2 L supercritical extractor and $CO_2$ was injected thereto. Then, a process of raising the temperature in the extractor to 70° C. over 1 hour and 20 minutes, and injecting and venting $CO_2$ at a rate of 0.5 L/min for 20 minutes upon reaching 70° C. and 150 bar, and stopping the injection of $CO_2$ for 20 minutes and keeping the status was repeated 4 times. Ethanol was recovered through the bottom of a separator upon the injection and venting of $CO_2$. Thereafter, $CO_2$ was vented over 2 hours to prepare a hydrophobic silica aerogel composite.

Example 4

Tetraethyl orthosilicate (TEOS) and water were mixed in a molar ratio of 1:6 and ethanol having a weight ratio of 1:1 with TEOS was added thereto to prepare a silica precursor solution. In order to promote hydrolysis of the silica precursor solution, an HCl aqueous solution was added such that the silica precursor solution had a pH of about 3, and stirred for 2 hours or more to prepare a hydrated TEOS solution. Ethanol having a weight ratio of 1:3 with the hydrated TEOS solution was added to prepare a silica sol. A base catalyst solution (5 wt % of NaOH aqueous solution) having a volume ratio of 99:1 with the silica sol was added to prepare a catalyzed sol. After filling 33.3 L of the catalyzed sol in an impregnation tank, a fiber (a glass fiber mat, 10 mm) as a substrate was passed therethrough to infiltrate the catalyzed sol into the fiber, wherein the catalyzed silica sol was impregnated into the fiber mat at a volume ratio of 1:1 (catalyzed silica sol:fiber). The fiber which passed through the impregnation tank to allow the catalyzed sol to infiltrate thereinto was gelled for 10 minutes while moving on a conveyor belt at a predetermined rate. In this case, the ambient atmosphere temperature at the top of the conveyor belt was maintained at 40° C. Thereafter, the wet gel composite which has gelled was added with 109 vol % of a solution as an aging solution, which was obtained by diluting 2.9 wt % of methyltriethoxysilane (MTES) in ethanol having a water content of 10 wt %, with respect to the volume of the wet gel composite to be aged at a temperature of 75° C. for 1 hour. The aged wet gel composite was added with 90 vol % of a solution (2 vol %) as a surface modifier, which was obtained by diluting trimethylethoxysilane(TMES) in ethanol, with respect to the volume of the wet gel composite, and then was subjected to surface modification at a temperature of 75° C. for 12 hours. Thereafter, silica wet gel was placed in a 7.2 L supercritical extractor and $CO_2$ was injected thereto. Then, a process of raising the temperature in the extractor to 70° C. over 1 hour and 20 minutes, and injecting and venting $CO_2$ at a rate of 0.5 L/min for 20 minutes upon reaching 70° C. and 150 bar, and stopping the injection of $CO_2$ for 20 minutes and keeping the status was repeated 4 times. Ethanol was recovered through the bottom of a separator upon the injection and venting of $CO_2$. Thereafter, $CO_2$ was vented over 2 hours to prepare a hydrophobic silica aerogel composite.

Example 5

Tetraethyl orthosilicate (TEOS) and water were mixed in a molar ratio of 1:6 and ethanol having a weight ratio of 1:1 with TEOS was added thereto to prepare a silica precursor solution. In order to promote hydrolysis of the silica precursor solution, an HCl aqueous solution was added such that the silica precursor solution had a pH of about 3, and stirred for 2 hours or more to prepare a hydrated TEOS solution. Ethanol having a weight ratio of 1:3 with the hydrated TEOS solution was added to prepare a silica sol. A base catalyst solution (5 wt % of NaOH aqueous solution) having a volume ratio of 99:1 with the silica sol was added to prepare a catalyzed sol. After filling 33.3 L of the catalyzed sol in an impregnation tank, a fiber (a glass fiber mat, 5 mm) as a substrate was passed therethrough to infiltrate the catalyzed sol into the fiber, wherein the catalyzed silica sol was impregnated into the fiber mat at a volume ratio of 0.6:1 (catalyzed silica sol:fiber). The fiber which passed through the impregnation tank to allow the catalyzed sol to infiltrate thereinto was gelled for 10 minutes while moving on a conveyor belt at a predetermined rate. In this case, the ambient atmosphere temperature at the top of the conveyor belt was maintained at 35° C. After the gelation was completed, stabilization was performed at room temperature (25° C.) for 10 minutes, and then primary aging was performed in an oven at 70° C. for 50 minutes. Thereafter, the wet gel composite which has gelled was added with 109 vol % of a solution, which was prepared by diluting 2.9 wt % of methyltriethoxysilane (MTES) in ethanol with a water content of 10 wt %, with respect to the volume of the volume of the wet gel composite to be subjected to secondary aging in an oven at 75° C. for 1 hour. The aged wet gel composite was added with 90 vol % of a solution (2 vol %) as a surface modifier, which was obtained by diluting trimethylethoxysilane(TMES) in ethanol, with respect to the volume of the wet gel composite, and then was subjected to surface modification at a temperature of 75° C. for 6 hours. Thereafter, silica wet gel was placed in a 7.2 L supercritical extractor and $CO_2$ was injected thereto. Then, a process of raising the temperature in the extractor to 70° C. over 1 hour and 20 minutes, and injecting and venting $CO_2$ at a rate of 0.5 L/min for 20 minutes upon reaching 70° C. and 150 bar, and stopping the injection of $CO_2$ for 20 minutes and keeping the status was repeated 4 times. Ethanol was recovered through the bottom of a separator upon the injection and venting of $CO_2$. Thereafter, $CO_2$ was vented over 2 hours to prepare a hydrophobic silica aerogel composite.

Comparative Example 1

Tetraethyl orthosilicate (TEOS) and water were mixed in a molar ratio of 1:4 and ethanol having a weight ratio of 1:1 with TEOS was added thereto to prepare a silica precursor solution. In order to promote hydrolysis of the silica precursor solution, an HCl aqueous solution was added such that the silica precursor solution had a pH of about 2, and stirred for 2 hours or more to prepare a hydrated TEOS solution. Ethanol having a weight ratio of 1:3 with the hydrated TEOS solution was added to prepare a silica sol. The silica sol and an ammonia solution (30 wt %) were mixed at a volume ratio of 99.5:0.5 to prepare a catalyzed sol. After filling 33.3 L of the catalyzed sol in an impregnation tank, a fiber (a glass fiber mat, 10 mm) as a substrate was passed therethrough to infiltrate the catalyzed sol into the fiber, wherein the catalyzed silica sol was impregnated into the fiber mat at a volume ratio of 1:1 (catalyzed silica sol:fiber). The fiber which passed through the impregnation tank to allow the catalyzed sol to infiltrate thereinto was gelled for 10 minutes while moving on a conveyor belt at a predetermined rate. In this case, the ambient atmosphere temperature at the top of the conveyor belt was maintained at 30° C. Thereafter, the wet gel composite which has gelled was left at 25° C. for 24 hours to be aged. The aged wet gel composite was added with 90 vol % of a hexamethyldisilazane(HMDS)/ethanol solution (volume ratio of 5:95) as a surface modifier with respect to the volume of the wet gel composite, and then was subjected to surface modification at a temperature of 75° C. for 4 hours. Thereafter, silica wet gel was placed in a 7.2 L supercritical extractor and $CO_2$ was injected thereto. Then, a process of raising the temperature in the extractor to 70° C. over 1 hour and 20 minutes, and injecting and venting $CO_2$ at a rate of 0.5 L/min for 20 minutes upon reaching 70° C. and 150 bar, and stopping the injection of $CO_2$ for 20 minutes and keeping the status was repeated 4 times. Ethanol was recovered through the bottom of a separator upon the injection and venting of $CO_2$. Thereafter, $CO_2$ was vented over 2 hours to prepare a hydrophobic silica aerogel composite.

Comparative Example 2

Tetraethyl orthosilicate (TEOS) and water were mixed in a molar ratio of 1:5 and ethanol having a weight ratio of 1:1 with TEOS was added thereto to prepare a silica precursor solution. In order to promote hydrolysis of the silica precursor solution, an HCl aqueous solution was added such that the silica precursor solution had a pH of about 2, and stirred for 2 hours or more to prepare a hydrated TEOS solution. Ethanol having a weight ratio of 1:3 with the hydrated TEOS solution was added to prepare a silica sol. The silica sol and an ammonia solution (30 wt %) were mixed at a volume ratio of 99.5:0.5 to prepare a catalyzed sol. After filling 33.3 L of the catalyzed sol in an impregnation tank, a fiber (a glass fiber mat, 10 mm) as a substrate was passed therethrough to infiltrate the catalyzed sol into the fiber, wherein the catalyzed silica sol was impregnated into the fiber mat at a volume ratio of 0.4:1 (catalyzed silica sol:fiber). The fiber which passed through the impregnation tank to allow the catalyzed sol to infiltrate thereinto was gelled for 10 minutes while moving on a conveyor belt at a predetermined rate. In this case, the ambient atmosphere temperature at the top of the conveyor belt was maintained at 25° C. Thereafter, the wet gel composite which has gelled was added with 109 vol % of a solution as an aging solution, which was obtained by diluting 2.9 wt % of methyltriethoxysilane (MTES) in ethanol having a water content of 10 wt %, with respect to the volume of the wet gel composite to be aged at a temperature of 75° C. for 1 hour. The aged wet gel composite was added with 90 vol % of a hexamethyldisilazane(HMDS)/ethanol solution (volume ratio of 5:95) as a surface modifier with respect to the volume of the wet gel composite, and then was subjected to surface modification at a temperature of 75° C. for 4 hours. Thereafter, silica wet gel was placed in a 7.2 L supercritical extractor and $CO_2$ was injected thereto. Then, a process of raising the temperature in the extractor to 70° C. over 1 hour and 20 minutes, and injecting and venting $CO_2$ at a rate of 0.5 L/min for 20 minutes upon reaching 70° C. and 150 bar, and stopping the injection of $CO_2$ for 20 minutes and keeping the status was repeated 4 times. Ethanol was recovered through the bottom of a separator upon the injection and venting of $CO_2$. Thereafter, $CO_2$ was vented over 2 hours to prepare a hydrophobic silica aerogel composite.

Comparative Example 3

Tetraethyl orthosilicate (TEOS) and water were mixed in a molar ratio of 1:3 and ethanol having a weight ratio of 1:1 with TEOS was added thereto to prepare a silica precursor solution. In order to promote hydrolysis of the silica precursor solution, an acid was added such that the silica precursor solution had a pH of about 3, and stirred for 2 hours or more to prepare a hydrated TEOS solution. Ethanol having a weight ratio of 1:6 with the hydrated TEOS solution was added to prepare a silica sol. A base catalyst solution (5 wt % of NaOH aqueous solution) having a volume ratio of 99:1 with the silica sol was added to prepare a catalyzed sol. A fiber (a glass fiber mat, 5 mm) as a substrate was passed therethrough to infiltrate the catalyzed sol into the fiber, wherein the catalyzed silica sol was impregnated at a volume ratio of 0.6:1 (catalyzed silica sol:glass fiber mat) with respect to the volume of the glass fiber mat, followed by performing gelation thereon 10 minutes later to prepare a wet gel composite. The fiber which passed through the impregnation tank to allow the catalyzed sol to infiltrate thereinto was gelled for 10 minutes while moving on a conveyor belt at a predetermined rate. In this case, the ambient atmosphere temperature at the top of the conveyor belt was maintained at 25° C. Thereafter, the wet gel composite which has gelled was added with 109 vol % of a solution as an aging solution, which was obtained by diluting 2.9 wt % of methyltriethoxysilane (MTES) in ethanol having a water content of 10 wt %, with respect to the volume of the wet gel composite to be aged at a temperature of 75° C. for 1 hour. The aged wet gel composite was added with 90 vol % of a hexamethyldisilazane (HMDS)/ethanol solution (volume ratio of 5:95) as a surface modifier with respect to the volume of the wet gel composite, and then was subjected to surface modification at a temperature of 75° C. for 4 hours. Thereafter, silica wet gel was placed in a 7.2 L supercritical extractor and $CO_2$ was injected thereto. Then, a process of raising the temperature in the extractor to 70° C. over 1 hour and 20 minutes, and injecting and venting $CO_2$ at a rate of 0.5 L/min for 20 minutes upon reaching 70° C. and 150 bar, and stopping the injection of $CO_2$ for 20 minutes and keeping the status was repeated 4 times. Ethanol was recovered through the bottom of a separator upon the injection and venting of $CO_2$. Thereafter, $CO_2$ was vented over 2 hours to prepare a hydrophobic silica aerogel composite.

Experimental Example 11 Measurement of Density and Pore Size-Specific Distribution 1. Density For the silica aerogel composite produced in each of Examples and Comparative Examples, five specimens having a size of 10 cm×10 cm were prepared, and then the weight of each specimen was measured, and the thickness of each specimen was measured using HFM 436 equipment from NETZSCH Co., Ltd. The measured weight and thickness, and the size were used to calculate the density, and the average density of the five specimens was determined as the final density, and the results are shown in Table 1 below.

2. Volume Ratio (%) of Effective Pores Having a Pore Diameter of 30 nm or Less

For the silica aerogel composite produced in each of Examples and Comparative Examples, the amount of nitrogen absorption/desorption according to partial pressure (0.11<p/p0<1) was analyzed using the ASAP 2010 equipment from Micrometrics Co., Ltd to measure specific surface area, pore volume, and pore diameter. The volume ratio of pores (effective pores) having a pore diameter in the numerical range of 30 nm or less in the measured pore volume was calculated, and the results are shown in Table 1 below.

TABLE 1

| Item | Density (g/cc) | Effective pore volume ratio (%) |
|---|---|---|
| Example 1 | 0.177 | 33.5 |
| Example 2 | 0.185 | 32.8 |
| Example 3 | 0.189 | 39.2 |
| Example 4 | 0.198 | 30.1 |

TABLE 1-continued

| Item | Density (g/cc) | Effective pore volume ratio (%) |
|---|---|---|
| Example 5 | 0.188 | 33.2 |
| Comparative Example 1 | 0.191 | 22.1 |
| Comparative Example 2 | 0.162 | 21.5 |
| Comparative Example 3 | 0.169 | 24.5 |

[Experimental Example 2] SAXS Analysis of Aerogel Particles

In order to perform the small angle X-ray diffraction (SAXS) analysis on the aerogel particles contained in the aerogel composites obtained in Examples 1 to 5 and Comparative Examples 1 to 3, first, the aerogel composites of Examples 1 to 5 and Comparative Examples 1 to 3 were prepared to have a size of 60 cm×12 cm in width and length. Each aerogel composite was placed in a sealable vinyl container and then repeatedly shaken up and down to apply shocks, thereby intentionally inducing separation of the aerogel powder (aerogel particles). A fiber substrate that was mixed in the obtained aerogel powder and was visible to the naked eye was removed with tweezers. Thereafter, in order to further remove the fiber substrate finely mixed in the separated powder for more precise analysis, the aerogel powder was placed in a 100 ml vial, and then distilled water was added thereto such that the weight ratio of powder and distilled water was approximately 1:130, and then shaken vigorously up and down 50 times. Then, the fiber substrate that settled at the bottom layer of the vial was removed, and the mass formed through the aggregation of the fiber substrate and the aerogel powder was also removed. Only the aerogel powder that was not formed to be an aggregate was carefully obtained and dried at 120° C. for 1 hour. 10 mg of the aerogel powder that was obtained in the end was taken and the following small angle X-ray scattering (SAXS) analysis was performed. Using Xeuss 2.0 X-ray scattering equipment from Xenocs, the aerogel powder specimens were placed about 2.5 m away from a detector and measured by incident X-rays, and Pilatus3 300K (2D detector) was used as the detector. Then, the scattered 2D diffraction pattern was obtained as an image, and this was calibrated using the sample-to-detector distance obtained through a standard specimen, and then, the scattering intensity (I(q)) according to the scattering wave number (Q) was calculated through circular averaging to obtain a graph showing the scattering intensity versus the scattering wave number (Q) logarithmically. In the small angle X-ray diffraction (SAXS) graph obtained for the aerogel powders of Examples 1 to 5 and Comparative Examples 1 to 3, after considering all measured values q (Intensity I(q)) in the wave number ranging from 0.015/Å to 0.035/Å, linear regression was obtained according to the method of least squares, and then the slope obtained by calculating the change value in scattering intensity according to changes in wave number of from 0.015/Å to 0.035/Å is shown in Table 2. The small angle X-ray diffraction (SAXS) graphs obtained for the aerogel powders of Examples 1 and 3 and Comparative Examples 1 and 2 are shown in FIGS. 1 and 2. However, in order to determine whether analysis of aerogel particles placed in the fiber substrate, rather than the aerogel powder separated from the aerogel composite, is available even by performing the small angle X-ray diffraction (SAXS) on the aerogel composite, a square specimen having a size of 1 cm×1 cm was obtained from the central portion of the aerogel composite of Example 1, and then a graph obtained through the small angle X-ray diffraction (SAXS) analysis using the same method is shown in FIG. 1.

TABLE 2

| Item | SAXS graph slope |
|---|---|
| Example 1 | −2.22 |
| Example 2 | −2.37 |
| Example 3 | −2.46 |
| Example 4 | −2.58 |
| Example 5 | −2.32 |
| Comparative Example 1 | −1.88 |
| Comparative Example 2 | −2.07 |
| Comparative Example 3 | −2.12 |

As shown in Table 2 and FIGS. 1 and 2, it was determined that in the aerogel powders derived from the aerogel composites of Examples 1 to 5 according to the present disclosure, the slope measured in the wave number ranging from 0.015/Å to 0.035/Å fell in the range of −2.80 to −2.20 in the small angle X-ray scattering (SAXS) graph. Accordingly, it was found that the aerogel powders of Examples 1 to 5 according to the present disclosure contained a high proportion of secondary aerogel particles having an oblate disk-like structure at the center whereas the aerogel powders of Comparative Examples 1 to 3 contained a high proportion of secondary aerogel particles having a disk-like structure, which is more likely to be two-dimensional (i.e., the form of disk having a flat center).

In addition, as shown in FIG. 1, in the small angle X-ray scattering (SAXS) graph for the aerogel powder of Example 1, the slope is −2.22, and in the small angle X-ray scattering (SAXS) graph for the aerogel composite specimen of Example 1, the slope for the same wave number range was measured to be −2.25, indicating that the small angle X-ray scattering (SAXS) analysis of the aerogel composite itself provides information about the shape of the aerogel particles contained therein.

[Experimental Example 3] Measurement of Recovery Rate and Heat Transmission Coefficient after Compression of Aerogel Composite The aerogel composites obtained in Examples 1 to 5 and Comparative Examples 1 to 3 were prepared to have a rectangular shape in a size of 60 cm×12 cm. However, in the following experiment, considering the specifications of the measuring equipment, ½ of the width of each aerogel composite was cut to obtain two specimens having a size of 30 cm×12 cm, and the two specimens were placed in parallel and rearranged to have a size of 30 cm×24 cm, and then analysis was performed on these specimens.

1. Compression recovery rate

As described above, the aerogel composite specimens obtained in Examples 1 to 5 and Comparative Examples 1 to 3 were compressed for 10 minutes at each pressure condition using QM900A-15T press equipment from QMESYS. The thickness of each of the aerogel composites was measured using the HFM436 equipment from Netzsch Co., Ltd., before the compression and 1 hour after the completion of the compression, and the compression recovery rate was calculated according to Equation 2 below, and the results are shown in Table 3 below. However, a pressure value shown in Table 3 below is a value of pressure applied per unit area of a specimen, and indicates a value obtained by multiplying a cylinder area of the press equipment by a set pressure value and dividing the product by the area of the specimen as shown in Equation 3 below. The cylinder radius of the QM900A-15T press equipment used in the present experiment is 6.25 cm, and the cylinder size is 12.5 cm.

Compression recovery rate (%)={(Cross-sectional thickness of aerogel composite after compression)/(Cross-sectional thickness of aerogel composite before compression)}×100 [Equation 2]

Actual pressure value=(Radius of inner diameter (cm) of cylinder of press equipment×Radius of inner diameter (cm) of cylinder of press equipment×3.14×set pressure value)/(Area(cm$^2$) of specimen) [Equation 3]

2. Heat Transmission Coefficient

The experiment was performed in the same manner as in 1 above, and the thermal conductivity of each of the aerogel composites was measured using the HFM436 equipment from Netzsch Co., Ltd., before the compression and 1 hour after the completion of the compression, and then the heat transmission coefficient was calculated, and the increase rate of the heat transmission coefficient compared to that before the compression was evaluated, and the results are shown in Table 4 below.

In addition, in order to determine the degree of change in the heat transmission coefficient before and after compression, the average value (b) of the heat transmission coefficients measured after compression with a pressure of no compression (0 bar), 3 bar, 9 bar, and 24 bar was calculated, and as shown in Equation 4 below, the difference between the heat transmission coefficient (a) measured after compression with a pressure of each of 0 bar, 3 bar, 9 bar, and 24 bar, and the average value (b) of the heat transmission coefficients, and A, which is the value obtained by dividing the difference by the average value (b) of the heat transmission coefficients, was calculated, and the results are shown in Table 5.

{(Heat transmission coefficient (a)before and after compression−Average value (b) of heat transmission coefficients before and after compression)}=(Average value (b) of heat transmission coefficients before and after compression)×A [Equation 4]

In addition, in order to determine the degree of change in the heat transmission coefficient after compression, the average value (d) of the heat transmission coefficients measured after compression with a pressure of 3 bar, 9 bar, and 24 bar was calculated, and as shown in Equation 5 below, the difference between the heat transmission coefficient (c) measured after compression with a pressure of 3 bar, 9 bar, or 24 bar, and the average value (d), and B, which is the value obtained by dividing the difference by the average value (d) of the heat transmission coefficients, was calculated, and the results are shown in Table 6.

(Heat transmission coefficient (c) after compression−Average value (d) of heat transmission coefficients after compression)=(Average value (d) of heat transmission coefficients after compression)×B [Equation 5]

Each result value shown in Tables 3 to 6 below is rounded from three decimal places and expressed to two decimal places.

TABLE 3

| Item | Pressure condition | Thickness after compression (mm) | Compression recovery rate (%) |
|---|---|---|---|
| Example 1 | — | 3.6 | 100.00 |
| | 3 bar 10 min | 3.4 | 94.44 |
| | 9 bar 10 min | 3 | 83.33 |
| | 24 bar 10 min | 2.6 | 72.22 |
| Example 2 | — | 3.7 | 100.00 |
| | 3 bar 10 min | 3.5 | 94.59 |
| | 9 bar 10 min | 3.2 | 86.49 |
| | 24 bar 10 min | 2.8 | 75.68 |
| Example 3 | — | 10.2 | 100.00 |
| | 3 bar 10 min | 8.9 | 87.25 |
| | 9 bar 10 min | 8.1 | 79.41 |
| | 24 bar 10 min | 7.9 | 77.45 |
| Example 4 | — | 9.8 | 100.00 |
| | 3 bar 10 min | 8.7 | 88.78 |
| | 9 bar 10 min | 8 | 81.63 |
| | 24 bar 10 min | 7.8 | 79.59 |
| Example 5 | — | 3.7 | 100.00 |
| | 3 bar 10 min | 3.6 | 97.30 |
| | 9 bar 10 min | 3.3 | 89.19 |
| | 24 bar 10 min | 2.9 | 78.38 |
| Comparative Example 1 | — | 9.1 | 100.00 |
| | 3 bar 10 min | 7.2 | 79.12 |
| | 9 bar 10 min | 5.1 | 56.04 |
| | 24 bar 10 min | 4.8 | 52.75 |
| Comparative Example 2 | — | 5.5 | 100.00 |
| | 3 bar 10 min | 4.6 | 83.64 |
| | 9 bar 10 min | 3.9 | 70.91 |
| | 24 bar 10 min | 2.5 | 45.45 |
| Comparative Example 3 | — | 3.9 | 100.00 |
| | 3 bar 10 min | 3.2 | 82.05 |
| | 9 bar 10 min | 2.5 | 64.10 |
| | 24 bar 10 min | 2 | 51.28 |

TABLE 4

| Item | Pressure condition | Heat transmission coefficient (W/m²K) | Heat transmission coefficient increase rate (Times) |
|---|---|---|---|
| Example 1 | — | 6.89 | — |
| | 3 bar 10 min | 7.03 | 1.02 |
| | 9 bar 10 min | 7.87 | 1.14 |
| | 24 bar 10 min | 9.04 | 1.31 |
| Example 2 | — | 5.00 | — |
| | 3 bar 10 min | 5.46 | 1.09 |
| | 9 bar 10 min | 6.31 | 1.26 |
| | 24 bar 10 min | 8.14 | 1.63 |
| Example 3 | — | 2.26 | — |
| | 3 bar 10 min | 2.62 | 1.16 |
| | 9 bar 10 min | 2.91 | 1.29 |
| | 24 bar 10 min | 3.10 | 1.37 |
| Example 4 | — | 1.58 | — |
| | 3 bar 10 min | 1.87 | 1.18 |
| | 9 bar 10 min | 2.23 | 1.41 |
| | 24 bar 10 min | 2.36 | 1.49 |
| Example 5 | — | 4.84 | — |
| | 3 bar 10 min | 5.03 | 1.04 |
| | 9 bar 10 min | 5.61 | 1.16 |
| | 24 bar 10 min | 6.62 | 1.37 |
| Comparative Example 1 | — | 1.85 | — |
| | 3 bar 10 min | 2.57 | 1.39 |
| | 9 bar 10 min | 4.69 | 2.54 |
| | 24 bar 10 min | 5.88 | 3.18 |
| Comparative Example 2 | — | 3.60 | — |
| | 3 bar 10 min | 4.98 | 1.38 |
| | 9 bar 10 min | 6.28 | 1.74 |
| | 24 bar 10 min | 10.48 | 2.91 |
| Comparative Example 3 | — | 6.44 | — |
| | 3 bar 10 min | 8.72 | 1.35 |
| | 9 bar 10 min | 13.12 | 2.04 |
| | 24 bar 10 min | 18.40 | 2.86 |

TABLE 5

| Item | Pressure condition | Heat transmission coefficients before and after compression (a) (W/m²K) | Average value of heat transmission coefficients before and after compression (b) (W/m²K) | Deviation of heat transmission coefficients before and after compression (a − b) (W/m²K) | Deviation of heat transmission coefficients/average value of heat transmission coefficients before and after compression (a − b/b = A) |
|---|---|---|---|---|---|
| Example 1 | 0 bar, 10 min | 6.89 | 7.71 | −0.82 | −0.11 |
| | 3 bar, 10 min | 7.03 | | −0.68 | −0.09 |
| | 9 bar, 10 min | 7.87 | | 0.16 | 0.02 |
| | 24 bar, 10 min | 9.04 | | 1.33 | 0.17 |
| Example 2 | 0 bar, 10 min | 5.00 | 6.23 | −1.23 | −0.20 |
| | 3 bar, 10 min | 5.46 | | −0.77 | −0.12 |
| | 9 bar, 10 min | 6.31 | | 0.08 | 0.01 |
| | 24 bar, 10 min | 8.14 | | 1.91 | 0.31 |
| Example 3 | 0 bar, 10 min | 2.26 | 2.72 | −0.46 | −0.17 |
| | 3 bar, 10 min | 2.62 | | −0.10 | −0.04 |
| | 9 bar, 10 min | 2.91 | | 0.19 | 0.07 |
| | 24 bar, 10 min | 3.10 | | 0.38 | 0.14 |
| Example 4 | 0 bar, 10 min | 1.58 | 2.01 | −0.43 | −0.21 |
| | 3 bar, 10 min | 1.87 | | −0.14 | −0.07 |
| | 9 bar, 10 min | 2.23 | | 0.22 | 0.11 |
| | 24 bar, 10 min | 2.36 | | 0.35 | 0.17 |
| Example 5 | 0 bar, 10 min | 4.84 | 5.53 | −0.69 | −0.12 |
| | 3 bar, 10 min | 5.03 | | −0.5 | −0.09 |
| | 9 bar, 10 min | 5.61 | | 0.08 | 0.01 |
| | 24 bar, 10 min | 6.62 | | 1.09 | 0.20 |

TABLE 5-continued

| Item | Pressure condition | Heat transmission coefficients before and after compression (a) (W/m²K) | Average value of heat transmission coefficients before and after compression (b) (W/m²K) | Deviation of heat transmission coefficients before and after compression (a − b) (W/m²K) | Deviation of heat transmission coefficients/average value of heat transmission coefficients before and after compression (a − b/b = A) |
|---|---|---|---|---|---|
| Comparative Example 1 | 0 bar, 10 min | 1.85 | 3.75 | −1.9 | −0.51 |
|  | 3 bar, 10 min | 2.57 |  | −1.18 | −0.31 |
|  | 9 bar, 10 min | 4.69 |  | 0.94 | 0.25 |
|  | 24 bar, 10 min | 5.88 |  | 2.13 | 0.57 |
| Comparative Example 2 | 0 bar, 10 min | 3.60 | 6.34 | −2.74 | −0.43 |
|  | 3 bar, 10 min | 4.98 |  | −1.36 | −0.21 |
|  | 9 bar, 10 min | 6.28 |  | −0.06 | −0.01 |
|  | 24 bar, 10 min | 10.48 |  | 4.14 | 0.65 |
| Comparative Example 3 | 0 bar, 10 min | 6.44 | 11.67 | −5.23 | −0.45 |
|  | 3 bar, 10 min | 8.72 |  | −2.95 | −0.25 |
|  | 9 bar, 10 min | 13.12 |  | 1.45 | 0.12 |
|  | 24 bar, 10 min | 18.40 |  | 6.73 | 0.58 |

TABLE 6

| Item | Pressure condition | Heat transmission coefficient after compression (c) (W/m²K) | Average value of heat transmission coefficients after compression (d) (W/m²K) | Deviation of heat transmission coefficients after compression (c − d) (W/m²K) | Deviation of heat transmission coefficients/average value of heat transmission coefficients after compression (c − d/d = B) |
|---|---|---|---|---|---|
| Example 1 | 3 bar, 10 min | 7.03 | 7.98 | −0.95 | −0.12 |
|  | 9 bar, 10 min | 7.87 |  | −0.11 | −0.01 |
|  | 24 bar, 10 min | 9.04 |  | 1.06 | 0.13 |
| Example 2 | 3 bar, 10 min | 5.46 | 6.64 | −1.18 | −0.18 |
|  | 9 bar, 10 min | 6.31 |  | −0.33 | −0.05 |
|  | 24 bar, 10 min | 8.14 |  | 1.50 | 0.23 |
| Example 3 | 3 bar, 10 min | 2.62 | 2.88 | −0.26 | −0.09 |
|  | 9 bar, 10 min | 2.91 |  | 0.03 | 0.01 |
|  | 24 bar, 10 min | 3.10 |  | 0.22 | 0.08 |
| Example 4 | 3 bar, 10 min | 1.87 | 2.15 | −0.28 | −0.13 |
|  | 9 bar, 10 min | 2.23 |  | 0.08 | 0.03 |
|  | 24 bar, 10 min | 2.36 |  | 0.21 | 0.10 |
| Example 5 | 3 bar, 10 min | 5.03 | 5.75 | −0.72 | −0.13 |
|  | 9 bar, 10 min | 5.61 |  | −0.14 | −0.03 |
|  | 24 bar, 10 min | 6.62 |  | 0.87 | 0.15 |
| Comparative Example 1 | 3 bar, 10 min | 2.57 | 4.38 | −1.81 | −0.41 |
|  | 9 bar, 10 min | 4.69 |  | 0.31 | 0.07 |
|  | 24 bar, 10 min | 5.88 |  | 1.50 | 0.34 |
| Comparative Example 2 | 3 bar, 10 min | 4.98 | 7.25 | −2.27 | −0.31 |
|  | 9 bar, 10 min | 6.28 |  | −0.97 | −0.13 |
|  | 24 bar, 10 min | 10.48 |  | 3.23 | 0.45 |
| Comparative Example 3 | 3 bar, 10 min | 8.72 | 13.41 | −4.69 | −0.35 |
|  | 9 bar, 10 min | 13.12 |  | −0.29 | −0.02 |
|  | 24 bar, 10 min | 18.40 |  | 4.99 | 0.37 |

As shown in Tables 4 to 6 above, it was confirmed that the aerogel composites of Examples 1 to 5 prepared according to the present disclosure had a higher compression recovery rate than the aerogel composites of Comparative Examples 1 to 3, and had a significantly small degree of increase in heat transmission coefficient even after the compression compared to before the compression, had a small change in heat transmission coefficient even when compressed at various pressure values from low to high pressures, and kept the thermal insulation performance at an excellent level.

From the results, it has been confirmed that the aerogel composite of the present disclosure has excellent elasticity, flexibility, and strength of pores, and thus, has excellent resilience even after high-pressure compression, and accordingly, it has been confirmed that sharp degradation in thermal insulation performance caused by the destruction of pores, particularly, destruction of pores having a size of 30 nm or less, is prevented, and the thermal insulation performance remains excellent even after the compression.

When applied as a thermal insulation material for batteries, electronic devices, automobiles, industrial devices, structures, or the like, an aerogel composite provided in the present disclosure may maintain an excellent level of thermal insulation properties without significant degradation even when compressed and deformed by a pressure applied to the aerogel composite due to expansion of various devices or structures positioned adjacent thereto, or other causes.

What is claimed is:

1. An aerogel composite comprising a fiber substrate; and an aerogel containing a plurality of open pores, wherein the aerogel includes a plurality of silica aerogel particles,
    wherein, in a small angle X-ray scattering (SAXS) graph showing a log plot of scattering intensity versus wave number for the silica aerogel particles, a slope in a wave number in a range of 0.015/Å to 0.035/Å is from −2.80 to −2.20,
    wherein the fiber substrate comprises glass fiber.

2. The aerogel composite of claim 1, wherein the small angle X-ray scattering graph is a graph derived from small angle X-ray diffraction analysis of the silica aerogel particles separated from the aerogel composite.

3. The aerogel composite of claim 1, wherein the small angle X-ray scattering graph is a graph derived from small angle X-ray diffraction analysis of the silica aerogel particles in the aerogel composite.

4. The aerogel composite of claim 1, wherein the aerogel composite is configured so that when the aerogel composite is compressed under application of a pressure at each of 3 bar, 9 bar, and 24 bar in a transverse direction with respect to a cross-section of the aerogel composite, a heat transmission coefficient of the aerogel composite after the compression is equal to or less than 1.8 times the heat transmission coefficient before the compression along the transverse direction.

5. The aerogel composite of claim 1, wherein the aerogel composite is configured so that when the aerogel composite is compressed under application of a pressure at each of 3 bar, 9 bar, and 24 bar in a transverse direction with respect to a cross-section of the aerogel composite, a heat transmission coefficient of the aerogel composite after the compression is greater than 1 time to equal to or less than 1.8 times the heat transmission coefficient before the compression along the transverse direction.

6. The aerogel composite of claim 1, wherein the aerogel composite is configured so that a heat transmission coefficient of the aerogel composite before and after compression satisfies Equation 4 below:

$$\{(\text{Heat transmission coefficient } (a) \text{ before and after compression} - \text{Average value } (b) \text{ of heat transmission coefficients before and after compression})\} = (\text{Average value } (b) \text{ of heat transmission coefficients before and after compression}) \times A, \quad [\text{Equation 4}]$$

wherein the heat transmission coefficient (a) before and after compression indicates the heat transmission coefficient of the aerogel composite obtained after compression under application of 0 bar, 3 bar, 9 bar, or 24 bar in a (transverse direction) with respect to a cross-section of the aerogel composite,
the average value (b) of heat transmission coefficients before and after compression is an average value of the heat transmission coefficients of the aerogel composite under no application of pressure, and heat transmission coefficients of the aerogel composite obtained after compression with a pressure value at each of 3 bar, 9 bar, and 24 bar in a transverse direction with respect to a cross-section of the aerogel composite, and
A is a rational number ranging from −0.40 to +0.40.

7. The aerogel composite of claim 1, wherein the aerogel composite is configured so that a heat transmission coefficient of the aerogel composite before and after compression satisfies Equation 4 below:

$$\{(\text{Heat transmission coefficient } (a) \text{ before and after compression} - \text{Average value } (b) \text{ of heat transmission coefficients before and after compression})\} = (\text{Average value } (b) \text{ of heat transmission coefficients before and after compression}) \times A, \quad [\text{Equation 4}]$$

wherein the heat transmission coefficient (a) before and after compression is the heat transmission coefficient of the aerogel composite obtained after compression under application of 0 bar, 3 bar, or 9 bar in a transverse direction with respect to a cross-section of the aerogel composite,
the average value (b) of heat transmission coefficients before and after compression is an average value of the heat transmission of the aerogel composite under no application of pressure, and heat transmission coefficients of the aerogel composite obtained after compression with a pressure value at each of 3 bar, and 9 bar in a transverse direction with respect to a cross-section of the aerogel composite, and
A is a rational number ranging from −0.23 to +0.23.

8. The aerogel composite of claim 1, wherein the aerogel composite is configured so that a heat transmission coefficient of the aerogel composite obtained after compression with a pressure at each of 3 bar, 9 bar, and 24 bar in a transverse direction with respect to a cross-section of the aerogel composite satisfies Equation 5 below:

$$(\text{Heat transmission coefficient } (c) \text{ after compression} - \text{Average value } (d) \text{ of heat transmission coefficients after compression}) = (\text{Average value } (d) \text{ of heat transmission coefficients after compression}) \times B, \quad [\text{Equation 5}]$$

wherein the heat transmission coefficient (c) after compression is the heat transmission coefficient of the aerogel composite obtained after compression with a pressure of 3 bar, 9 bar, or 24 bar in the transverse direction with respect to the cross-section of the aerogel composite,
the average value (d) of heat transmission coefficients after compression is an average value of the heat transmission coefficients of the aerogel composite obtained after compression with a pressure of each of 3 bar, 9 bar, and 24 bar in the transverse direction with respect to the cross-section of the aerogel composite, and
B is a rational number ranging from −0.30 to +0.30.

9. The aerogel composite of claim 1, wherein the aerogel composite is configured so that a change rate (C) of heat transmission coefficient of the aerogel composite after compression per unit application pressure represented by Equation 6 below is a rational number ranging from −0.15 to +0.15:

$$C = (\text{heat transmission coefficient after compression with a pressure of } x - \text{heat transmission coefficient after compression with a pressure of } y)/(x-y), \quad [\text{Equation 6}]$$

wherein x and y are each independently 3 bar or 24 bar, but are different pressure values.

10. The aerogel composite of claim 1, wherein the aerogel composite is configured so that when the aerogel composite is under application of a pressure at each of 3 bar, 9 bar, and 24 bar in a transverse direction with respect to a cross-section of the aerogel composite, a compression recovery rate represented by Equation 2 below is 60% or greater:

Compression recovery rate (%)={(Cross-sectional thickness of aerogel composite after compression)/(Cross-sectional thickness of aerogel composite before compression)}×100. [Equation 2]

11. The aerogel composite of claim 1, wherein the aerogel comprises pores having a pore diameter of 30 nm or less at 30% to 45% of the pore volume of a skeletal structure.

12. The aerogel composite of claim 1, wherein the aerogel comprises silica, methylsilylated silica, dimethylsilylated silica, trimethylsilylated silica, or a mixture thereof.

13. The aerogel composite of claim 1, wherein the silica aerogel particles comprise particles in which a plurality of aerogel particles having a particle diameter of greater than 0 to 5 nm or less are aggregated or bonded to form the aggregated or bonded particles.

14. The aerogel composite of claim 13, wherein the aggregated or bonded particles have an average particle diameter ranging from 5 to 2,000 nm.

15. The aerogel composite of claim 1, wherein the aerogel composite has a thickness ranging from 0.5 mm to 20 mm.

16. The aerogel composite of claim 1, wherein the aerogel composite has a density ranging from 0.05 to 0.50 g/cm$^3$.

17. The aerogel composite of claim 1, wherein the aerogel composite has a compressive strength of 20 kPa to 80 kPA at 10% deformation and a tensile strength ranging from 30 N/cm$^2$ to 60 N/cm$^2$.

18. A thermal insulation member comprising the aerogel composite of claim 1.

19. The thermal insulation member of claim 18, further comprising a support member positioned on at least one of an upper surface or a lower surface of the aerogel composite.

* * * * *